US010106245B2

(12) United States Patent
Wilkens

(10) Patent No.: US 10,106,245 B2
(45) Date of Patent: Oct. 23, 2018

(54) AUTOMATIC FLIGHT CONTROL ACTUATOR SYSTEMS

(71) Applicant: HONEYWELL INTERNATIONAL INC., Morris Plains, NJ (US)

(72) Inventor: Dean Wilkens, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 295 days.

(21) Appl. No.: 14/886,801

(22) Filed: Oct. 19, 2015

(65) Prior Publication Data

US 2017/0106971 A1 Apr. 20, 2017

(51) Int. Cl.
*B64C 13/18* (2006.01)
*B64C 13/28* (2006.01)
*B64C 27/605* (2006.01)
*B64C 13/46* (2006.01)
*B64C 13/50* (2006.01)

(52) U.S. Cl.
CPC ............. *B64C 13/18* (2013.01); *B64C 13/28* (2013.01); *B64C 13/46* (2013.01); *B64C 13/50* (2013.01); *B64C 27/605* (2013.01)

(58) Field of Classification Search
CPC ... F16H 49/00; F16H 2049/008; B64C 13/04; B64C 13/18; B64C 27/605; B64C 13/50; B64C 13/46; B64C 13/28
See application file for complete search history.

(56) References Cited

U.S. PATENT DOCUMENTS

| 2,877,968 A | 3/1959 | Granan et al. |
| 3,265,332 A | 8/1966 | Rasmussen |
| 4,094,481 A | 6/1978 | DeWalt |
| 4,274,808 A | 6/1981 | Garner et al. |
| 4,345,195 A | 8/1982 | Griffith et al. |
| 4,512,710 A | 4/1985 | Flatau |
| 4,716,785 A | 1/1988 | Godai et al. |
| 5,178,031 A | 1/1993 | Orsi et al. |
| 5,201,239 A | 4/1993 | Bundo et al. |

(Continued)

FOREIGN PATENT DOCUMENTS

| CN | 102730186 A | 10/2012 |
| EP | 0990819 A1 | 4/2000 |

(Continued)

OTHER PUBLICATIONS

Lemmer L., Kiss B.; Control of Differential Mode Harmonic Drive Systems, 2009, Springer, Dordrecht (Year: 2009).*

(Continued)

*Primary Examiner* — Valentina Xavier
(74) *Attorney, Agent, or Firm* — Lorenz & Kopf, LLP

(57) ABSTRACT

Automatic flight control actuator systems are provided. In one example, the system includes a pilot input linkage that receives an input and a flight surface output linkage adapted to control a flight surface. The system also includes a strain wave gear including a flex spline coupled to one of the pilot input linkage and the flight surface output linkage. The strain wave gear further includes a circular spline coupled to the other of the flight surface output linkage and the pilot input linkage, and coupled to the flex spline such that the input from the pilot input linkage is transferred to the flight surface output linkage via the strain wave gear.

17 Claims, 11 Drawing Sheets

(56) References Cited

U.S. PATENT DOCUMENTS

| | | | |
|---|---|---|---|
| 5,634,373 A | 6/1997 | Cuffe et al. | |
| 5,816,117 A | 10/1998 | Berry et al. | |
| 6,269,711 B1 | 8/2001 | Tejima | |
| 6,573,672 B2 | 6/2003 | O'Rourke et al. | |
| 8,084,972 B2 | 12/2011 | Strong et al. | |
| 8,534,155 B2 | 9/2013 | Long | |
| 8,628,046 B2 | 1/2014 | Grohmann et al. | |
| 8,888,036 B2 | 11/2014 | Chaduc et al. | |
| 2014/0021303 A1* | 1/2014 | Salamat | B64C 13/04 244/231 |
| 2016/0229525 A1* | 8/2016 | Van De Veire | B64C 13/50 |
| 2017/0350491 A1* | 12/2017 | Wilkens | F16H 49/001 |

FOREIGN PATENT DOCUMENTS

| | | |
|---|---|---|
| GB | 826215 | 5/1960 |
| JP | 2015059652 A | 3/2015 |

OTHER PUBLICATIONS

Lindemann R A, et al.: Mars Exploration Rover Mobility Assembly Design, Test and Performance; Systems, Man and Cybernetics, 2005 IEEE International Conference on, IEEE, Piscataway, NJ; vol. 1, Oct. 10, 2005.

Extended EP Search Report for Application No. 17170302.8-1754 dated Nov. 8, 2017.

USPTO Notice of Allowance for U.S. Appl. No. 15/171,733 dated Mar. 29, 2018.

* cited by examiner

AUTOMATIC FLIGHT CONTROL ACTUATOR SYSTEMS

TECHNICAL FIELD

The present disclosure generally relates to automatic flight systems, and more particularly relates to a compact automatic flight control actuator system for use with an aircraft.

BACKGROUND

Certain mobile platforms, such as aircraft, employ automatic flight servo systems to assist the pilot in piloting of the aircraft and to augment flight stability during pilot operation. Automatic flight servo systems may also maintain stable flight during non-piloted operation of the aircraft. Generally, these automatic flight servo systems comprise numerous actuators and mechanical couplings in order to meet federal requirements and to perform the requested operations. These actuators and mechanical couplings are connected via linkages and distributed throughout the structure of the aircraft. Due to the numerous actuators, mechanical couplings and linkages, automatic flight servo systems may be too large and heavy for medium and smaller aircraft, especially rotorcraft where weight is critical. Moreover, integrating series actuators into primary flight control linkages introduces challenging mechanical requirements due to vibration resonances and often requires additional analysis a to maintain structural stability.

Accordingly, it is desirable to provide an improved automatic flight control actuator system, which is lighter and compact for use on smaller aircraft. Furthermore, other desirable features and characteristics of the present invention will become apparent from the subsequent detailed description and the appended claims, taken in conjunction with the accompanying drawings and the foregoing technical field and background.

SUMMARY

According to various embodiments, an automatic flight control actuator system is provided. The system includes a pilot input linkage that receives an input and a flight surface output linkage adapted to control a flight surface. The system also includes a strain wave gear including a flex spline coupled to one of the pilot input linkage and the flight surface output linkage. The strain wave gear further includes a circular spline coupled to the other of the flight surface output linkage and the pilot input linkage, and coupled to the flex spline such that the input from the pilot input linkage is transferred to the flight surface output linkage via the strain wave gear.

Further provided according to various embodiments is an automatic flight control actuator system. The system includes a pilot input linkage that receives an input, and a flight surface output linkage adapted to control a flight surface. The system also includes a stability augmentation system for moving the flight surface output linkage. The system includes a strain wave gear including a flex spline coupled to the pilot input linkage, a circular spline coupled to the flight surface output linkage and a wave generator coupled to the stability augmentation system. The circular spline is coupled to the flex spline such that the input from the pilot input linkage is transferred to the flight surface output linkage and the stability augmentation system drives the wave generator to move the flight surface output linkage independent of the input from the pilot input linkage.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. Moreover, while the automatic flight actuator system is described herein as being used onboard a mobile platform, such as an aircraft, for example, an airplane, rotorcraft or spacecraft, it will be understood that the various teachings of the present disclosure may be employed with any suitable mobile platform, such as a bus, motorcycle, heavy equipment vehicles, train, motor vehicle, marine vessel and the like. In addition, the various teachings of the present disclosure can be employed with a stationary platform in which it is desired to transfer input into an output without the use of complex mechanical linkages. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

In addition, for the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
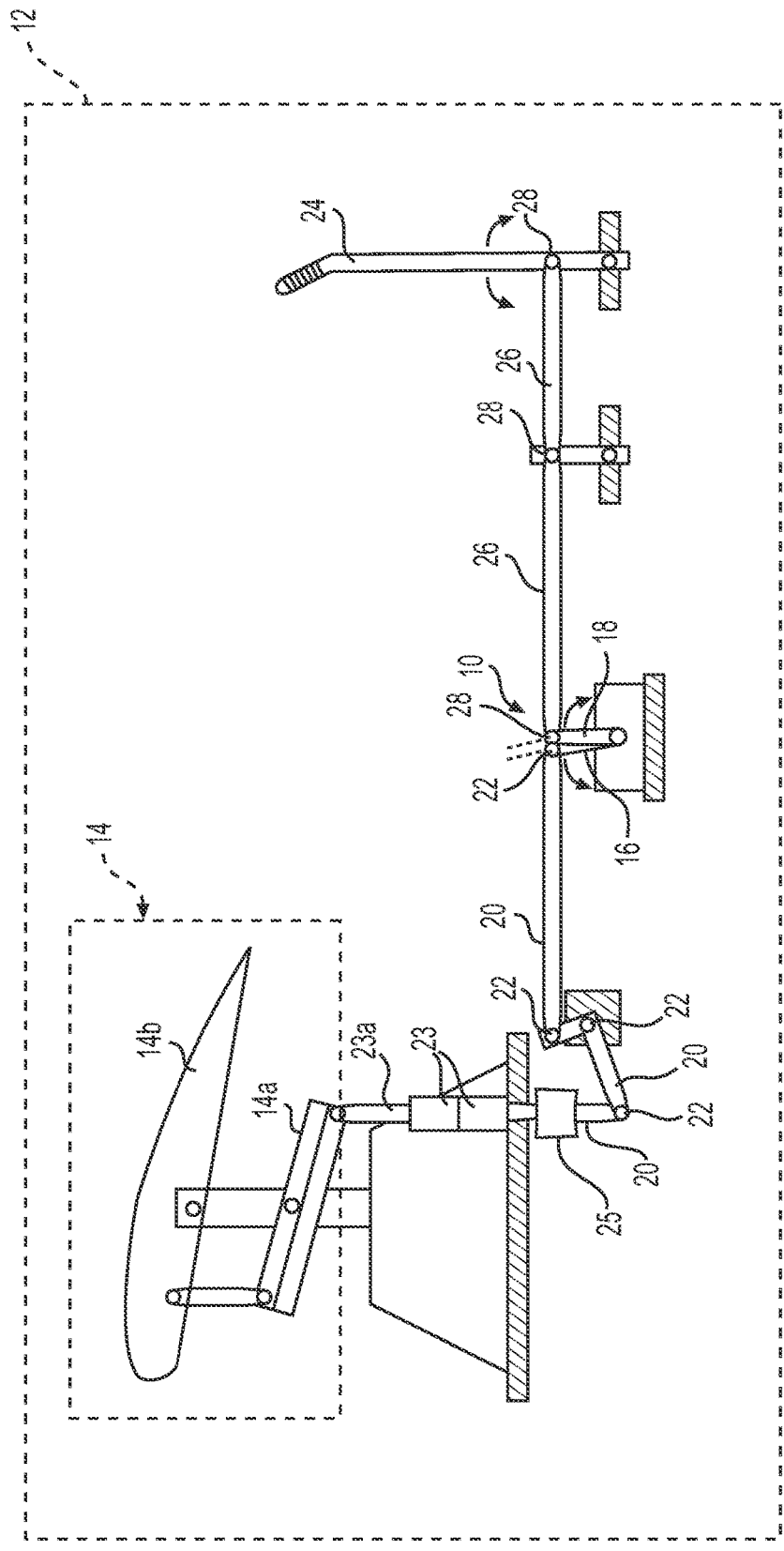
FIG. 1 is a schematic perspective illustration of a compact automatic flight actuator system for use with a mobile platform in accordance with various embodiments.

With reference to FIG. 1, an automatic flight control actuator system 10 is shown. The automatic flight control actuator system 10 may be referred to as an "Autopilot" system 10. The automatic flight control actuator system 10 may be employed with an aircraft 12 to substantially automatically control the operation or movement of one or more flight surfaces 14 associated with the aircraft 12. For example, in the example of the aircraft 12 as a rotorcraft, the one or more flight surfaces 14 comprise a rotor blade 14b coupled to a swashplate 14a. It should be understood, however, that the automatic flight control actuator system 10 may control any suitable flight surface associated with the aircraft 12. In the following example, the automatic flight control actuator system 10 provides output to the swashplate 14a for controlling the operation or movement of a rotor blade 14b. In this example, the automatic flight control actuator system 10 includes a flight surface or swashplate output linkage 16 and a pilot input linkage 18. The swashplate output linkage 16 is coupled to the swashplate 14a via one or more linkages 20, couplings 22, one or more hydraulic cylinders 23 and a mixer 25, and the pilot input linkage 18 is coupled to a pilot control stick 24 to receive input from a pilot via one or more linkages 26 and couplings 28. It will be understood, however, that the linkages 20, 26 and couplings 22, 28 illustrated herein are merely exemplary, and any suitable technique may be employed to couple the pilot control stick 24 and the swashplate 14a to the automatic flight control actuator system 10.

Figure 2:
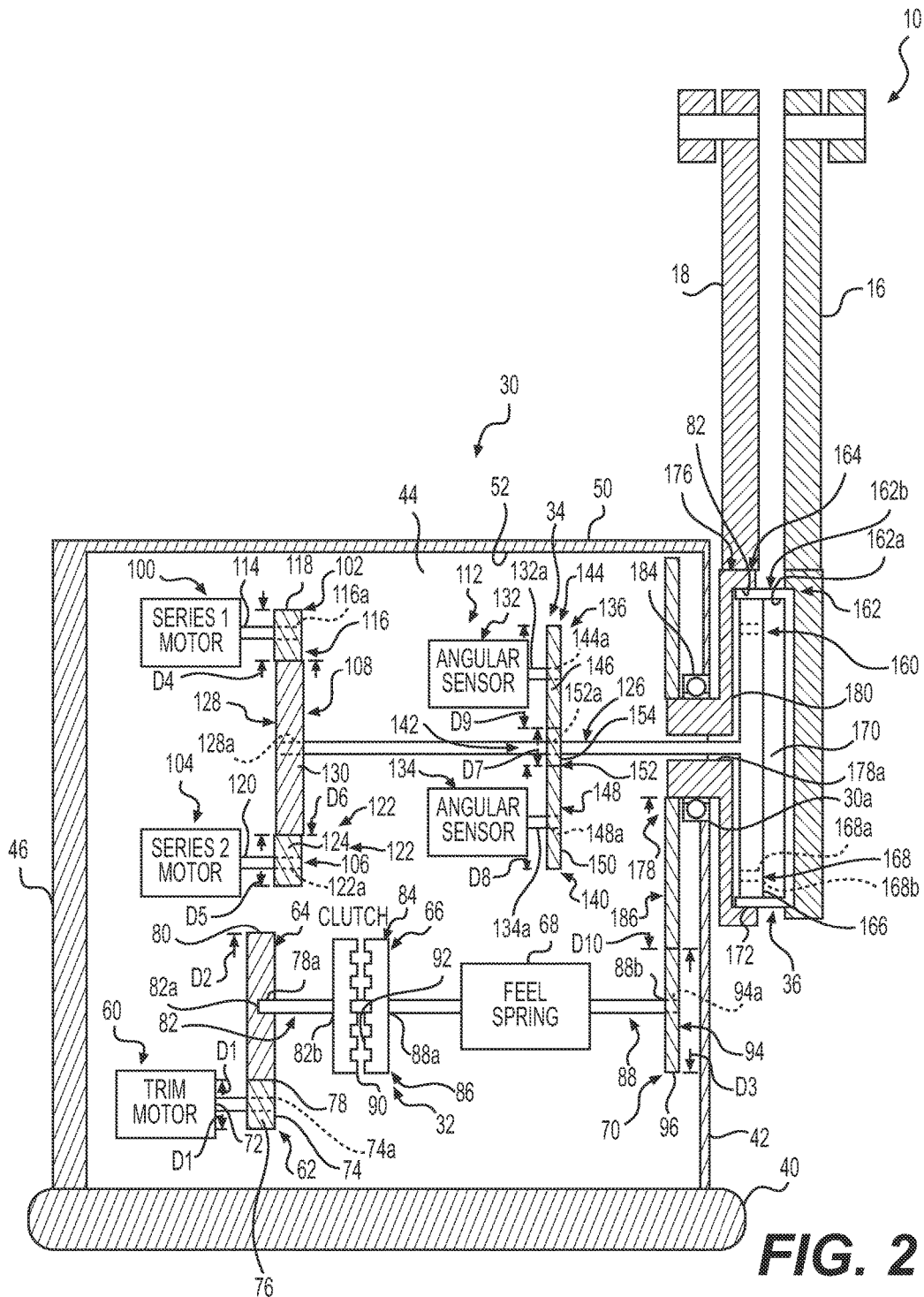
FIG. 2 is a schematic cross-sectional illustration of the automatic flight actuator system of FIG. 1, taken along line 2-2 of FIG. 3, in accordance with various embodiments.

The one or more hydraulic cylinders 23 are coupled to the swashplate 14a via one or more actuators 23a. The one or more hydraulic cylinders 23 receive one or more control signals from the mixer 25 to move the swashplate 14a via the one or more actuators 23a based on one or more pilot inputs. In one example, the mixer 25 may be coupled between the one or more hydraulic cylinders 23 and the automatic flight control actuator system 10 to assist in converting control inputs from the pilot, such as input received via the automatic flight control actuator system 10, into motion for the one or more hydraulic cylinders 23 associated with the swashplate 14a. In this example, the automatic flight control actuator system 10 may be coupled to "lower controls" of the aircraft 12 prior to the mixer 25. With reference to FIG. 2, the automatic flight control actuator system 10 also includes a housing 30, a trim input system 32, a stability augmentation system 34 and a strain wave gear 36.

The housing 30 encloses and surrounds the trim input system 32, the stability augmentation system 34 and at least a portion of the strain wave gear 36. Generally, the swashplate output linkage 16 and the pilot input linkage 18 are disposed substantially outside of the housing 30, however; it will be understood that all or a portion of the swashplate output linkage 16 and the pilot input linkage 18 may be disposed within the housing 30, if desired. The housing 30 may be composed of any suitable material, and in one example, is composed of a metal or metal alloy. The housing 30 is illustrated herein as substantially rectangular in shape, however, the housing 30 may have any desired shape necessary to enclose the trim input system 32, the stability augmentation system 34 and at least a portion of the strain wave gear 36. The housing 30 includes a cover 38 and a base 40. In one example, the cover 38 is movable relative to the base 40 to enable the assembly of the trim input system 32, the stability augmentation system 34 and at least a portion of the strain wave gear 36 within the housing 30. In one example, the cover 38 is removable from the base 40, via one or more mechanical fasteners, to enable access to the trim input system 32, the stability augmentation system 34 and at least a portion of the strain wave gear 36 disposed within the cover 38. It should be noted, however, that the cover 38 need not be completely removable relative to the base 40, but rather, the cover 38 may be pivotable or hingedly connected to the base 40. It should be noted that the cover 38 and the base 40 illustrated and described herein are merely exemplary, as the housing 30 may have any desired shape, such as a clamshell, etc.

In this example, the cover 38 has a first side 42, a second side 44, a third side 46, a fourth side 48 (FIG. 3) and a fifth side 50, which cooperate to define a cavity 52. The cavity 52 receives the trim input system 32, the stability augmentation system 34 and at least a portion of the strain wave gear 36. The cover 38 may include one or more supports, which may be integrally formed within the cavity 52 and/or formed discretely from the cover 38 and coupled within the cavity 52 to support portions of the trim input system 32, the stability augmentation system 34 and at least a portion of the strain wave gear 36 as needed.

The base 40 supports the cover 38. The base 40 is generally solid, and may include one or more coupling features, such as coupling bores, for receipt of one or more mechanical fasteners, to couple the housing 30 to the aircraft 12 (FIG. 1). It should be noted, however, that the housing 30 may be coupled to the aircraft 12 via any suitable technique, and thus, the use of mechanical fasteners is merely exemplary. The base 40 is illustrated herein as having a width greater than a width of the cover 38; however, the base 40 may have a width substantially equal to the width of the cover 38.

The trim input system 32 is received within the cavity 52 of the cover 38, and is generally contained wholly within the housing 30. The trim input system 32 maintains the position of the pilot control stick 24. In one example, the trim input system 32 includes a trim motor 60, a first gear 62, a second gear 64, a clutch 66, a feel biasing member or spring 68 and a third gear 70. During manual flight, the trim input system 32 provides a force from the spring 68, which the pilot pushes against when moving a control, such as the pilot control stick 24. The trim motor 60 through the clutch 66 acts as a ground for the spring 68 so it exerts a force against pilot control motion. The pilot has the option of controlling the clutch 66 and the trim motor 60 in manual flight to allow adjustment of the neutral location of the spring 68. Pushing a "Force Trim Release" button on the control disengages the clutch 66 and allows the pilot to reposition the pilot control, such as the pilot control stick 24, with no force or compression of the spring 68. Releasing the button reengages the clutch 66 and once again the spring 68 exerts force against pilot motion but from a new neutral position where the button was released. In addition, the pilot can push "trim beep" switches which will drive the trim motor 60 and reposition the spring 68 while the clutch 66 remains engaged to allow the pilot to incrementally adjust the spring 68 neutral position. If the pilot engages the automatic flight control actuator system 10, the pilot is normally not exerting force on the pilot control, such as the pilot control stick 24, and the spring 68 will hold the pilot control stick 24 in a fixed position. The automatic flight control actuator system 10 may also sense an average position of a first stability augmentation motor 100 and a second stability augmentation motor 104 of the stability augmentation system 34 and if the first stability augmentation motor 100 and the second stability augmentation motor 104 are positioned towards the end of their travel range, a command is sent from a control module to the trim motor 60 to drive the trim motor 60 in a direction to offload the first stability augmentation motor 100 and the second stability augmentation motor 104 to allow the motors 100, 104 to re-center to the middle of their control range.

The trim motor 60 is coupled to the first gear 62 via an output shaft 72. Generally, the trim motor 60 is a lower bandwidth actuator, which has a higher stroke. The trim motor 60 is responsive to one or more control signals or an electric current to move or rotate the output shaft 72. Generally, the trim motor 60 is coupled in parallel with the pilot control stick 24 and has full range authority. The rotation of the output shaft 72 drives the first gear 62.

The first gear 62 is coupled to the output shaft 72 via any suitable technique, such as press-fit, welding, etc. The first gear 62 is generally composed of a metal or metal alloy, and may be formed or manufactured through any suitable technique, such as casting, machining, hot isostatic pressing, etc. The first gear 62 may have a diameter D1, which is smaller than a diameter D2 of the second gear 64. The first gear 62 includes a hub 74 and a first engagement surface 76. The hub 74 defines a bore 74*a*, which couples the first gear 62 to the output shaft 72. The first engagement surface 76 couples or engages the first gear 62 with the second gear 64. In one example, the first engagement surface 76 comprises a first plurality of teeth defined about a perimeter or circumference of the first gear 62 at a periphery of the first gear 62. The gear ratio of the trim motor 60 to the output shaft 72 may be about 10 to 1 or more. The first gear 62 and the second gear 64 may each comprise a worm gear or similar to allow the use of a small multi-turn trim motor 60. By using a worm gear, the first gear 62 and the second gear 64 each have a high resistance to being backdriven such that the trim motor 60 will act as a stop or ground position when not being driven.

The second gear 64 is driven by the first gear 62. The second gear 64 is generally composed of a metal or metal alloy, and may be formed or manufactured through any suitable technique, such as casting, machining, hot isostatic pressing, etc. The second gear 64 includes a hub 78 and a second engagement surface 80. The hub 78 defines a bore 78*a*, which couples the second gear 64 to a driving shaft 82 of the clutch 66. The second gear 64 is coupled to the driving shaft 82 via any suitable technique, such as press-fit, welding, etc. The second engagement surface 80 couples or engages the second gear 64 with the first gear 62. In one example, the second engagement surface 80 comprises a second plurality of teeth defined about a perimeter or circumference of the second gear 64 at a periphery of the second gear 64.

The clutch 66 is coupled to the second gear 64 and the third gear 70. In one example, the clutch 66 includes the driving shaft 82, a first clutch plate 84, a second clutch plate 86 and a driven shaft 88. It should be noted that the clutch 66 described and illustrated herein is merely exemplary, as the clutch 66 may comprise any suitable clutch, such as a magnetic clutch, for engaging and disengaging the driving shaft 82 and the driven shaft 88. Generally, the clutch 66 is responsive to one or more control signals from the control module to engage and couple the driving shaft 82 with the driven shaft 88 or to disengage and decouple the driving shaft 82 from the driven shaft 88 to enable adjustment of the spring 68, as discussed above. For example, the clutch 66 may receive one or more control signals to engage the first clutch plate 84 with the second clutch plate 86 based on the control module receiving a signal to set a position of the pilot control stick 24. The driving shaft 82 is coupled to the second gear 64 at a first end 82*a* so as to be driven by the trim motor 60 via the first gear 62 and the second gear 64. The driving shaft 82 is also coupled to the first clutch plate 84 at a second end 82*b*.

The first clutch plate 84 is composed of a suitable metal or metal alloy, and defines a first friction surface 90. The first friction surface 90 may comprise a ceramic or compound organic resin, which is capable of frictionally engaging a second friction surface 92 of the second clutch plate 86 to couple the driving shaft 82 with the driven shaft 88. The second clutch plate 86 is composed of a suitable metal or metal alloy, and defines the second friction surface 92. The second friction surface 92 cooperates with the first friction surface 90 to couple the first clutch plate 84 with the second clutch plate 86.

The driven shaft 88 is coupled to the second clutch plate 86 at a first end 88*a*. A second end 88*b* of the driven shaft 88 is coupled to the third gear 70. When the clutch 66 is engaged, the torque from the output shaft 72 of the trim motor 60 is transferred through the first gear 62, the second gear 64 and the driving shaft 82 to the driven shaft 88, which in turn rotates the third gear 70. As will be discussed, the rotation of the third gear 70 drives a portion of the strain wave gear 36.

The spring 68 is disposed about the driven shaft 88. In one example, the spring 68 is coupled about the driven shaft 88 between the first end 88*a* and the second end 88*b*. The spring 68 comprises any suitable biasing member, such as a coil spring, etc. The spring 68 is generally coupled about the driven shaft 88 such that the spring 68 is able to provide resistance against the movement of the driven shaft 88 so that as the pilot applies input to the pilot control stick 24, the spring 68 resists the pilot input to provide the pilot with the feel of a resistance during manual flight. Thus, one end of the spring 68 may be fixedly coupled to a portion of the driven shaft 88, while another end of the spring 68 is coupled to a portion of the housing 30 within the cavity 52 such that the spring 68 resists input to the driven shaft 88. Generally, the spring 68 may be coupled to the driven shaft 88 in any suitable arrangement that resists the motion of the driven shaft 88.

The third gear 70 is coupled to the second end 88*b* of the driven shaft 88, and is coupled to a portion of the strain wave gear 36. The third gear 70 is coupled to the driven shaft 88 via any suitable technique, such as press-fit, welding, etc. The third gear 70 is generally composed of a metal or metal alloy, and may be formed or manufactured through any suitable technique, such as casting, machining, hot isostatic pressing, etc. The third gear 70 may have a diameter D3, which is greater than the diameter D1 of the first gear 62 and substantially smaller than a diameter D2 of the second gear 64. The third gear 70 includes a hub 94 and a third engagement surface 96. The hub 94 defines a bore 94a, which couples the third gear 70 to the driven shaft 88. The third engagement surface 96 couples or engages the third gear 70 with a portion of the strain wave gear 36. In one example, the third engagement surface 96 comprises a third plurality of teeth defined about a perimeter or circumference of the third gear 70 at a periphery of the third gear 70.

The stability augmentation system 34 controls or adjusts the swashplate output linkage 16 independently of the input by the pilot to the pilot control stick 24 to ensure stable movement of the flight surfaces 14, such as the swashplate 14a (FIG. 1). In one example, the stability augmentation system 34 includes the first stability augmentation motor 100, a fourth gear 102, the second stability augmentation motor 104, a fifth gear 106, a sixth gear 108 and a sensor system 112. The first stability augmentation motor 100 and the second stability augmentation motor 104 are used during manual flight to augment the flying qualities of the aircraft 12 by providing control outputs which are mechanically summed with the pilot manual inputs to improve aircraft handling qualities and help stabilize the aircraft 12. The first stability augmentation motor 100 and the second stability augmentation motor 104 are also used when the automatic flight control actuator system 10 is engaged and become the primary autopilot actuation motors. In this role they provide rate and attitude control inputs along with outer loop control commands such as altitude hold, heading select, localizer and glide slope modes. Since their control range may be limited the trim motor 60 assists the first stability augmentation motor 100 and the second stability augmentation motor 104 with large authority low frequency motion inputs.

The first stability augmentation motor 100 comprises a brushless motor, which has an output shaft 114. In one example, the first stability augmentation motor 100 has a minimum no load speed at output of about 25 degrees per second (s) and has a minimum force at the output shaft of about 25 pounds (lb.). The first stability augmentation motor 100 has a no load speed of about 6000 revolutions per minute (rpm) and a torque constant of about 0.1 inch-pounds per ampere (in.-lb/amp). The first stability augmentation motor 100 is responsive to one or more control signals from the control module to rotate the output shaft 114. The rotation of the output shaft 114 drives the fourth gear 102.

The fourth gear 102 is coupled to the output shaft 114 of the first stability augmentation motor 100. The fourth gear 102 is coupled to the output shaft 114 via any suitable technique, such as press-fit, welding, etc. The fourth gear 102 is generally composed of a metal or metal alloy, and may be formed or manufactured through any suitable technique, such as casting, machining, hot isostatic pressing, etc. The fourth gear 102 may have a diameter D4, which is about equal to the diameter D1 of the first gear 62. The diameter D4 may comprise about one-fifth a diameter D6 of the sixth gear 108 to allow the first stability augmentation motor 100 to drive about five times faster than a wave generator input shaft 126 associated with the strain wave gear 36. The fourth gear 102 includes a hub 116 and a fourth engagement surface 118. The hub 116 defines a bore 116a, which couples the fourth gear 102 to the output shaft 114. The fourth engagement surface 118 couples or engages the fourth gear 102 with the sixth gear 108. In one example, the fourth engagement surface 118 comprises a fourth plurality of teeth defined about a perimeter or circumference of the fourth gear 102 at a periphery of the fourth gear 102. The ratio of the output of the first stability augmentation motor 100 to the fourth gear 102 may be about 1000 to 1.

The second stability augmentation motor 104 comprises a brushless motor, which has an output shaft 120. The second stability augmentation motor 104 may generally be the same type of motor as the first stability augmentation motor 100 or may be a different type. In one example, the second stability augmentation motor 104 has a minimum no load speed at output of about 25 degrees per second (s) and has a minimum force at the output shaft of about 25 pounds (lb.). The second stability augmentation motor 104 has a no load speed of about 6000 revolutions per minute (rpm) and a torque constant of about 0.1 inch-pounds per ampere (in.-lb/amp). The second stability augmentation motor 104 is responsive to one or more control signals from the control module to rotate the output shaft 120. The rotation of the output shaft 120 drives the fifth gear 106. Generally, the output shaft 120 of the second stability augmentation motor 104 rotates in a direction, clockwise or counterclockwise, which is different than or opposite the direction of rotation of the output shaft 114 such that the fourth gear 102 and the fifth gear 106 may cooperate together to move or drive the sixth gear 108.

The fifth gear 106 is coupled to the output shaft 120 of the second stability augmentation motor 104. The fifth gear 106 is coupled to the output shaft 120 via any suitable technique, such as press-fit, welding, etc. The fifth gear 106 is generally composed of a metal or metal alloy, and may be formed or manufactured through any suitable technique, such as casting, machining, hot isostatic pressing, etc. The fifth gear 106 may have a diameter D5, which is about equal to the diameter D4 of the fourth gear 102. The fifth gear 106 includes a hub 122 and a fifth engagement surface 124. The hub 122 defines a bore 122a, which couples the fifth gear 106 to the output shaft 120. The fifth engagement surface 124 couples or engages the fifth gear 106 with the sixth gear 108. In one example, the fifth engagement surface 124 comprises a fifth plurality of teeth defined about a perimeter or circumference of the fifth gear 106 at a periphery of the fifth gear 106. The ratio of the output of the second stability augmentation motor 104 to the fifth gear 106 may be about 1000 to 1.

The sixth gear 108 is coupled to both the fourth gear 102 and the fifth gear 106. The sixth gear 108 is coupled to the wave generator input shaft 126 of the strain wave gear 36 and is driven by either one of or both of the fourth gear 102 and the fifth gear 106 to adjust the swashplate output linkage 16 independently of the input by the pilot. The sixth gear 108 has a diameter D6, which is larger than the diameter D5 of the fifth gear 106. Generally, the sixth gear 108 is sized and configured such that the gear ratio between the sixth gear 108 and each of the fourth gear 102 and the fifth gear 106 is about 1 to 5. The sixth gear 108 is coupled to the wave generator input shaft 126 via any suitable technique, such as press-fit, welding, etc. The sixth gear 108 is generally composed of a metal or metal alloy, and may be formed or manufactured through any suitable technique, such as casting, machining, hot isostatic pressing, etc. The sixth gear 108 includes a hub 128 and a sixth engagement surface 130. The hub 128 defines a bore 128a, which couples the sixth gear 108 to the wave generator input shaft 126. The sixth engagement surface 130 couples or engages the sixth gear 108 with each of the fourth gear 102 and the fifth gear 106. In one example, the sixth engagement surface 130 comprises a sixth plurality of teeth defined about a perimeter or circumference of the sixth gear 108 at a periphery of the sixth gear 108.

The sensor system 112 observes conditions associated with the stability augmentation system 34 and generates sensor signals based thereon. In one example, the sensor system 112 comprises a first sensor 132, a second sensor 134, a seventh gear 136, an eighth gear 140 and a ninth gear 142. It should be noted that while the sensor system 112 is described and illustrated herein as including both the first sensor 132 and the second sensor 134, the sensor system 112 may include a single sensor, if desired.

The first sensor 132 and the second sensor 134 may each comprise an angular sensor, such as a resistive angular sensor, that is capable of observing a position of the swashplate output linkage 16 relative to the pilot input linkage 18. It should be noted, however, that the first sensor 132 and the second sensor 134 may comprise any sensor that is capable of observing a position of the swashplate output linkage 16 relative to the pilot input linkage 18, including, but not limited to hall effect sensors, linear variable differential transformer (LVDT) sensors, potentiometers, etc. In the example of the first sensor 132 and the second sensor 134 comprising angular sensors, the first sensor 132 and the second sensor 134 each include an driven shaft 132a, 134a, which are coupled to a respective one of the seventh gear 136 and the eighth gear 140. The first sensor 132 and the second sensor 134 generate sensor signals based on the movement of the driven shaft 132a, 134a. The first sensor 132 and the second sensor 134 may be in communication with the control module, which receives these sensor signals from the first sensor 132 and the second sensor 134 and determines a position of the swashplate output linkage 16 relative to the pilot input linkage 18 based on these sensor signals The seventh gear 136 is coupled to the driven shaft 132a of the first sensor 132, and the eighth gear 140 is coupled to the driven shaft 134a of the second sensor 134. Each of the seventh gear 136 and the eighth gear 140 are driven by the ninth gear 142. The seventh gear 136 and the eighth gear 140 each have a diameter D7, D8, which is larger than a diameter D9 of the ninth gear 142. Generally, the seventh gear 136 and the eighth gear 140 are each sized and configured such that the gear ratio between the ninth gear 142 and each of the seventh gear 136 and the eighth gear 140 is about 5 to 1. The seventh gear 136 and the eighth gear 140 are coupled to the respective one of the driven shaft 132a, 134a via any suitable technique, such as press-fit, welding, etc. The seventh gear 136 and the eighth gear 140 are generally composed of a metal or metal alloy, and may be formed or manufactured through any suitable technique, such as casting, machining, hot isostatic pressing, etc.

The seventh gear 136 includes a hub 144 and a seventh engagement surface 146. The hub 144 defines a bore 144a, which couples the seventh gear 136 to the driven shaft 132a. The seventh engagement surface 146 couples or engages the seventh gear 136 with the ninth gear 142. In one example, the seventh engagement surface 146 comprises a seventh plurality of teeth defined about a perimeter or circumference of the seventh gear 136 at a periphery of the seventh gear 136.

The eighth gear 140 includes a hub 148 and an eighth engagement surface 150. The hub 148 defines a bore 148a, which couples the eighth gear 140 to the driven shaft 134a. The eighth engagement surface 150 couples or engages the eighth gear 140 with the ninth gear 142. In one example, the eighth engagement surface 150 comprises an eighth plurality of teeth defined about a perimeter or circumference of the eighth gear 140 at a periphery of the eighth gear 140.

The ninth gear 142 is coupled to the wave generator input shaft 126, and drives the seventh gear 136 and the eighth gear 140. The ninth gear 142 is coupled to the wave generator input shaft 126 via any suitable technique, such as press-fit, welding, etc. The ninth gear 142 is generally composed of a metal or metal alloy, and may be formed or manufactured through any suitable technique, such as casting, machining, hot isostatic pressing, etc. The ninth gear 142 includes a hub 152 and a ninth engagement surface 154. The hub 152 defines a bore 152a, which couples the ninth gear 142 to the wave generator input shaft 126. The ninth engagement surface 154 couples or engages the ninth gear 142 with each of the seventh gear 136 and the eighth gear 140. In one example, the ninth engagement surface 154 comprises a ninth plurality of teeth defined about a perimeter or circumference of the ninth gear 142 at a periphery of the ninth gear 142.

The strain wave gear 36 is coupled to the trim input system 32, the stability augmentation system 34, the swashplate output linkage 16 and the pilot input linkage 18. The strain wave gear 36 comprises a wave generator 160, a flex spline 162 and a circular spline 164. The wave generator 160 is coupled to and rotatable within the flex spline 162. The wave generator 160 includes a wave generator cam 166, a bearing 168, and the wave generator input shaft 126. The wave generator cam 166 is generally elliptical, and is received within the bearing 168. The wave generator cam 166 is composed of a suitable material, such as a metal or metal alloy. The bearing 168 is a thin-raced ball bearing, having an inner ring 168a and an outer ring 168b. In one example, the races and the balls of the bearing 168 are generally composed of a metal or metal alloy. The wave generator cam 166 is coupled to the bearing 168 such that the inner ring 168a of the bearing 168, and thus, the outer ring 168b, conforms to the elliptical shape of the wave generator cam 166. The wave generator input shaft 126 is coupled to the wave generator cam 166. The wave generator input shaft 126 moves or rotates based on input from the first stability augmentation motor 100 and/or the second stability augmentation motor 104. The rotation of the wave generator input shaft 126 drives the wave generator cam 166, which in turn drives the bearing 168 within the flex spline 162.

The flex spline 162 is coupled to the swashplate output linkage 16 and to the wave generator 160. In one example, the flex spline 162 comprises a cylindrical thin-walled housing, which includes an inner surface 162a and an outer surface 162b. The flex spline 162 also defines a substantially circular cavity 170, which is bounded by the inner surface 162a. The inner surface 162a receives the wave generator 160. The outer surface 162b defines a tenth engagement surface 172, which is coupled to or engages the circular spline 164. In one example, the tenth engagement surface 172 comprises a tenth plurality of teeth defined about a portion of the outer surface 162b. The tenth engagement surface 172 may define about 198 teeth. As the flex spline 162 is composed of a metal or metal alloy, such as steel, with a thin-wall thickness, the flex spline 162 moves or deflects upon the rotation of the elliptical wave generator 160 within the cavity 170. The deflection of the flex spline 162 with the movement of the wave generator 160 causes the tenth engagement surface 172 of the flex spline 162 to move relative to the circular spline 164. Generally, the movement of the flex spline 162 is in an opposite direction (e.g. clockwise or counterclockwise) than the movement of the wave generator 160.

The circular spline 164 is coupled to the pilot input linkage 18, the trim input system 32 and the flex spline 162. The circular spline 164 is generally composed of a metal or metal alloy, and includes a base 176 and a hub 178. The base 176 defines an annular or ring-shaped opening 180 and an eleventh engagement surface 182. The ring-shaped opening 180 receives the flex spline 162 such that the eleventh engagement surface 182 engages with the tenth engagement surface 172 of the flex spline 162. The eleventh engagement surface 182 is defined about an inner circumference of the ring-shaped opening 180, and in one example, comprises an eleventh plurality of teeth. The eleventh engagement surface 182 may define about 200 teeth, which may result in a gear reduction ratio of about 100 to 1.

The hub 178 is supported on the housing 30 for rotation via a bearing 184. The bearing 184 is received in an opening 30a defined in the first side 42 of the housing 30. In one example, the bearing 184 comprises a ball bearing, however, any suitable bearing or bushing may be employed to assist in the rotation of the circular spline 164. The hub 178 defines a bore 178a, which is sized to receive a portion of the wave generator input shaft 126 such that the wave generator input shaft 126 may rotate freely relative to the hub 178. An end of the hub 178 is coupled to a tenth gear 186. The tenth gear 186 is fixedly coupled to the hub 178 to drive the hub 178, and thus, the circular spline 164, based on input from the trim motor 60 of the trim input system 32. The tenth gear 186 is coupled to the hub 178 via any suitable technique, such as press-fit, welding, etc. The tenth gear 186 is generally composed of a metal or metal alloy, and may be formed or manufactured through any suitable technique, such as casting, machining, hot isostatic pressing, etc. The tenth gear 186 defines a bore 186a and a twelfth engagement surface 186b. The bore 186a couples the tenth gear 186 to the hub 178. The twelfth engagement surface 186b couples or engages the tenth gear 186 with the third gear 70. In one example, the twelfth engagement surface 186b comprises a twelfth plurality of teeth defined about a perimeter or circumference of the tenth gear 186 at a periphery of the tenth gear 186. Generally, the tenth gear 186 has a diameter D10, which is greater than the diameter D3 of the third gear 70.

In order to assemble the automatic flight control actuator system 10, in one example, the second gear 64 is coupled to the driving shaft 82 of the clutch 66. The second gear 64 and the clutch 66 may be positioned in the housing 30, and with the first gear 62 coupled to the trim motor 60, the first gear 62 and the trim motor 60 may be arranged in the housing 30 such that the first gear 62 is meshingly engaged with the second gear 64. The spring 68 is coupled about the driven shaft 88, and the third gear 70 is coupled to the driven shaft 88. The circular spline 164 is coupled to the housing 30 such that the hub 178 is received within the opening 30a to be rotatably coupled to the bearing 184 and the tenth gear 186 meshingly engages with the third gear 70. The wave generator input shaft 126 is inserted through the bore 178a of the hub 178, with the wave generator cam 166 coupled to the bearing 168. The flex spline 162 may be coupled to the wave generator 160 and to the circular spline 164.

The ninth gear 142 is coupled to the wave generator input shaft 126, and the sixth gear 108 is coupled to the wave generator input shaft 126 at an end of the wave generator input shaft 126. With the fourth gear 102 coupled to the first stability augmentation motor 100 and the fifth gear 106 coupled to the second stability augmentation motor 104, the first stability augmentation motor 100 and the second stability augmentation motor 104 may be arranged within the housing 30 such that the fourth gear 102 and fifth gear 106 meshingly engage with the sixth gear 108. With the seventh gear 136 and the eighth gear 140 coupled to the respective one of the first sensor 132 and the second sensor 134, the first sensor 132 and the second sensor 134 may be arranged in the housing 30 such that the seventh gear 136 and the eighth gear 140 meshingly engage with the ninth gear 142. The pilot input linkage 18 and the swashplate output linkage 16 may be coupled to the circular spline 164 and the flex spline 162, respectively. The pilot input linkage 18 and the swashplate output linkage 16 may be coupled to the respective one of the pilot control stick 24 and the flight surfaces 14 via the linkages 20, 26 and couplings 22, 28.

With the automatic flight control actuator system 10 assembled, upon receipt of an input from the pilot via the pilot control stick 24 to the pilot input linkage 18, the input from the pilot moves or rotates the pilot input linkage 18, causing a rotation of the circular spline 164. The rotation of the circular spline 164 causes a rotation of the flex spline 162, which thereby causes a rotation of the swashplate output linkage 16. In one example, with reference to FIG. 3, the pilot input linkage 18 has a range of motion R between about positive or negative 40 degrees, and the swashplate output linkage 16 has a range of motion SR between about positive or negative 5 degrees relative to the motion of the pilot input linkage 18 for a total range of motion of about positive or negative 45 degrees due to the gear ratio of the strain wave gear 36. In addition, the pilot input linkage 18 may include one or more stops 18a, which may limit the range of motion of the swashplate output linkage 16 relative to the pilot input linkage 18 by contacting a portion of the swashplate output linkage 16. In one example, the gear ratio of the strain wave gear 36 is about 200 to 1. Based on the gear ratio of the strain wave gear 36, the motion of the swashplate via the swashplate output linkage 16 may be calculated as:

$$\delta_{SP} = \delta_{PI}\left[1 + \frac{1}{GR}\right] - \frac{\delta_{WG}}{GR} \qquad (1)$$

Wherein $\delta_{SP}$ is the motion of the swashplate 14a via the swashplate output linkage 16; $\delta_{PI}$ is the pilot input motion received via the pilot input linkage 18; GR is the gear reduction of the strain wave gear 36; and $\delta_{WG}$ is the motion of the wave generator received from the first stability augmentation motor 100 and/or the second stability augmentation motor 104.

With reference back to FIG. 2, based on one or more control signals from the control module, the first stability augmentation motor 100 and/or the second stability augmentation motor 104 may rotate the respective output shaft 114, 120 to drive the sixth gear 108 via the fourth gear 102 and/or the fifth gear 106. By driving the sixth gear 108, the first stability augmentation motor 100 and/or the second stability augmentation motor 104 rotate the wave generator input shaft 126. The rotation of the wave generator input shaft 126 causes a rotation of the seventh gear 136 and the eighth gear 140. The first sensor 132 and the second sensor 134 observe this rotation of the seventh gear 136 and the eighth gear 140 and generate sensor signals based thereon.

The rotation of the wave generator input shaft 126 also causes the rotation of the wave generator cam 166 and bearing 168 within the flex spline 162. This rotation of the wave generator cam 166 and the bearing 168 within the flex spline 162 results in a deflection and movement of the flex spline 162, thereby resulting in a movement of the swashplate output linkage 16, and thus, the swashplate 14a.

The trim motor 60 may adjust a position of the pilot control stick 24 (FIG. 1) based on the receipt of one or more control signals to rotate the output shaft 72. The rotation of the output shaft 72 causes the first gear 62 to drive the second gear 64. With the clutch 66 engaged, the driving of the second gear 64 results in the rotation of the driven shaft 88. The first end 88a of the driven shaft 88 exerts motion to the spring 68 which in turn exerts motion to the second end 88b of the driven shaft 88. With minimal external loads the spring 68 will not deflect and the motion will be transferred directly. The driving of the third gear 70 via the second end 88b of the driven shaft 88 drives or rotates the tenth gear 186, which in turn, rotates the hub 178 and the circular spline 164. The rotation of the circular spline 164 moves the pilot input linkage 18, and thus, the pilot control stick 24 (FIG. 1). Depending on external loads induced by the pilot via the pilot control stick 24, for example, the spring 68 may compress or extend to allow output motion independent of the trim motor 60. This motion will induce a spring force proportional to the deflection resulting in a force sensed by the pilot.

Thus, the use of the strain wave gear 36 in the automatic flight control actuator system 10 directly translates input from the pilot control stick 24 into output for the swashplate 14a. The use of the strain wave gear 36 provides substantially zero backlash during relative movement, which provides a reliable connection between the pilot input linkage 18 and the swashplate output linkage 16. The strain wave gear 36 may be sized to carry very large static loads from input to output without reverting to an overly large drive as the strain wave gear 36 enables as many as about 30% of the total teeth to remain engaged at all times. The strain wave gear 36 isolates the first stability augmentation motor 100 and the second stability augmentation motor 104 to a low force domain, thereby reducing the size and the cost associated with the first stability augmentation motor 100 and the second stability augmentation motor 104. Moreover, by coupling the pilot input linkage 18 to the circular spline 164 and the swashplate output linkage 16 to the flex spline 162, an issue with the stability augmentation system 34 does not interfere with or restrict the primary control path of the swashplate 14a via the pilot input linkage 18. The gear ratio of the strain wave gear 36 (e.g. about 200 to 1) combined with an additional gear pass to the first sensor 132 and the second sensor 134 (1 to 5) will limit the rotation of the first sensor 132 and the second sensor 134 to less than about 1 revolution and therefore allow the control module in communication with the first sensor 132 and the second sensor 134 to determine relative input to output position directly from the first sensor 132 and the second sensor 134 for use in a position control method.

Figure 3:
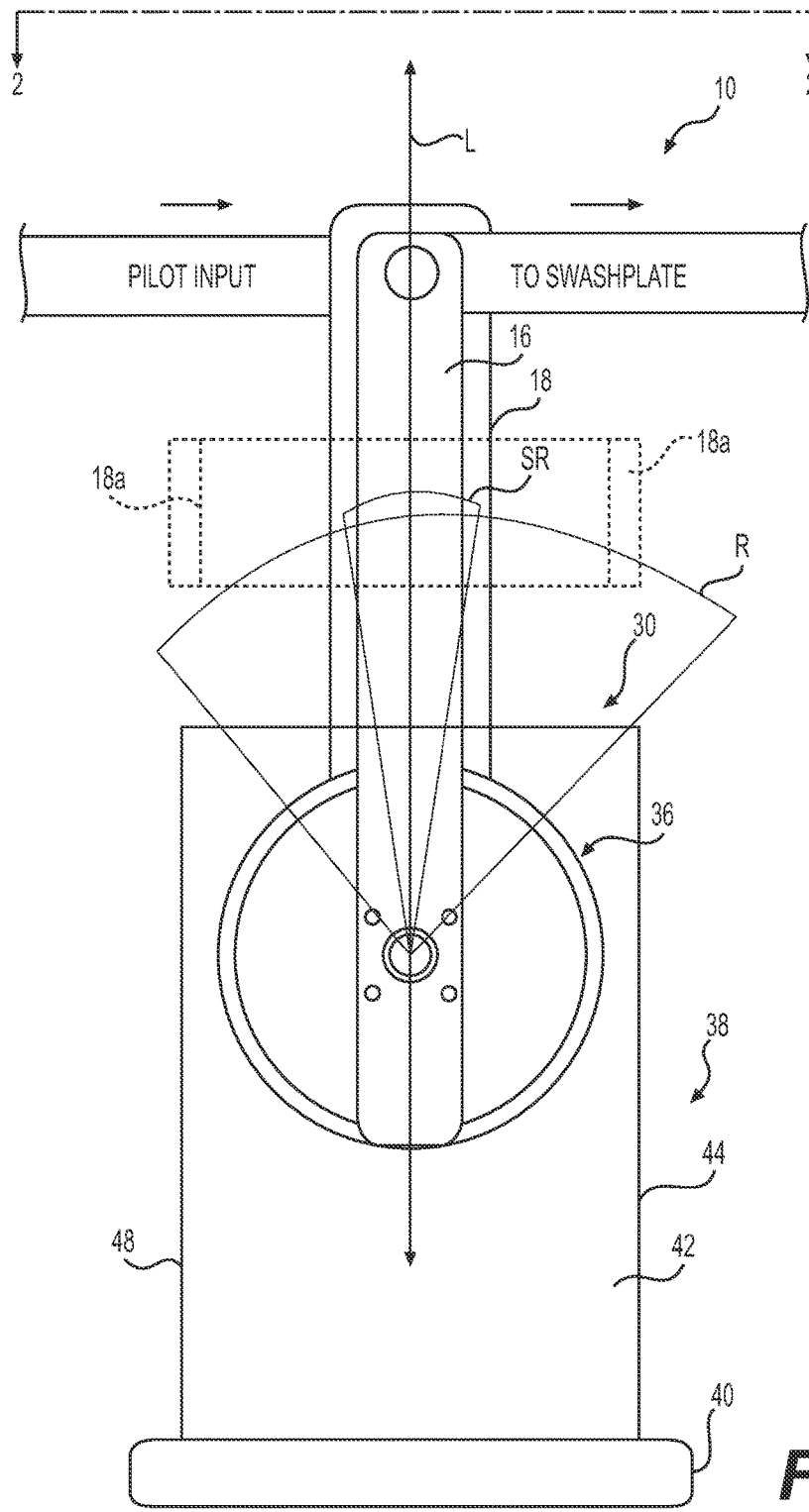
FIG. 3 is a schematic side view of the automatic flight actuator system of FIG. 1.

It should be noted that the coupling of the swashplate output linkage 16 to the flex spline 162 and the coupling of the pilot input linkage 18 to the circular spline 164 in FIGS. 2 and 3 is merely an example arrangement for the automatic flight control actuator system 10. In this regard, the automatic flight control actuator system 10 may include the swashplate output linkage 16 coupled to the circular spline 164, and the pilot input linkage 18 and the spring 68 coupled to the flex spline 162. In this example, the motion of the swashplate via the swashplate output linkage 16 may be calculated as:

$$\delta_{SP} = \delta_{PI}\left[1 - \frac{1}{GR}\right] + \frac{\delta_{WG}}{GR} \quad (2)$$

Wherein $\delta_{SP}$ is the motion of the swashplate 14a via the swashplate output linkage 16; $\delta_{PI}$ is the pilot input motion received via the pilot input linkage 18; GR is the gear reduction of the strain wave gear 36; and $\delta_{WG}$ is the motion of the wave generator received from the first stability augmentation motor 100 and/or the second stability augmentation motor 104.

Figure 4:
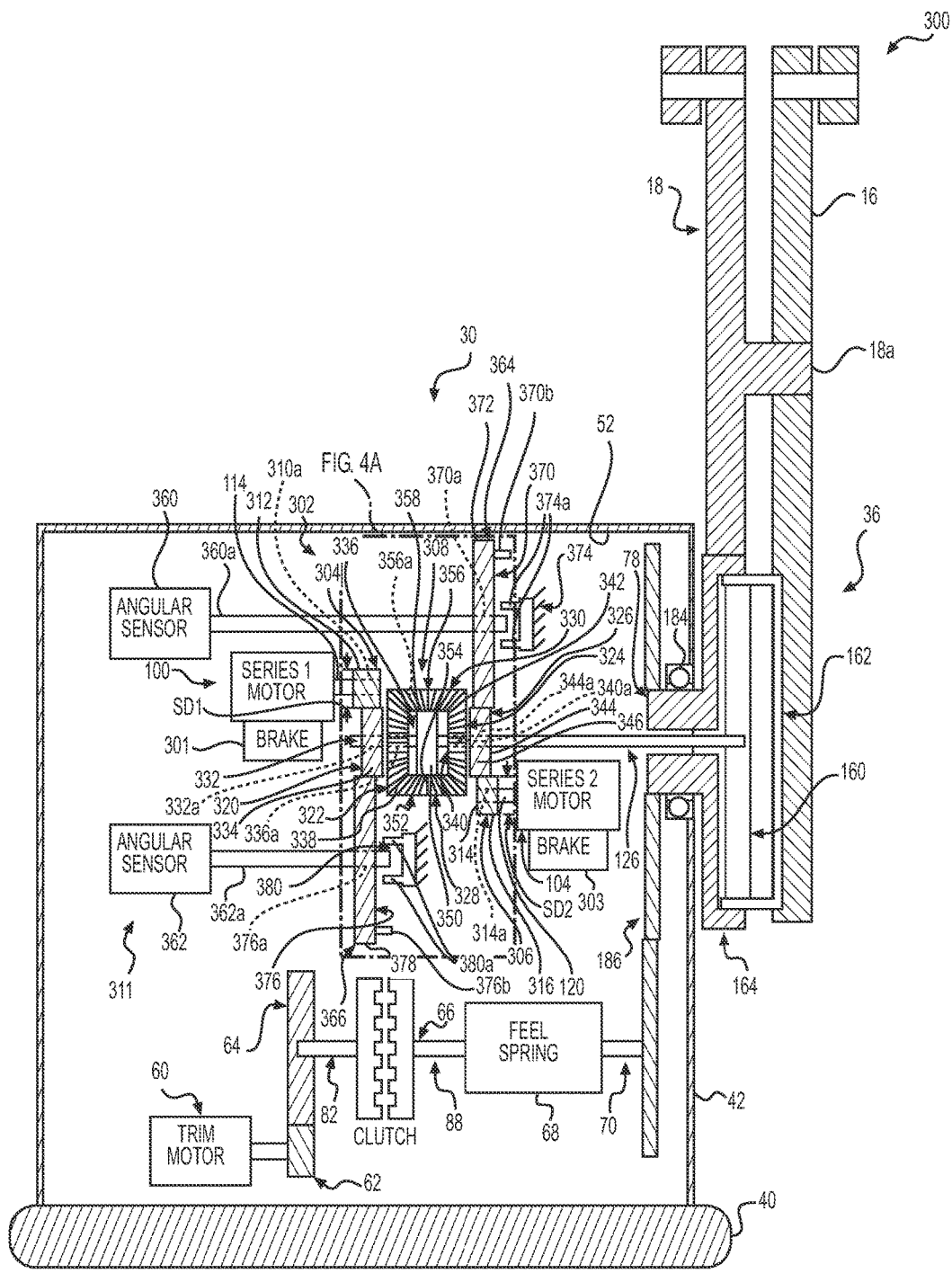
FIG. 4 is a schematic cross-sectional illustration of an automatic flight actuator system for use with the mobile platform of FIG. 1, taken along line 4-4 of FIG. 5, in accordance with various embodiments.
Figure 5:
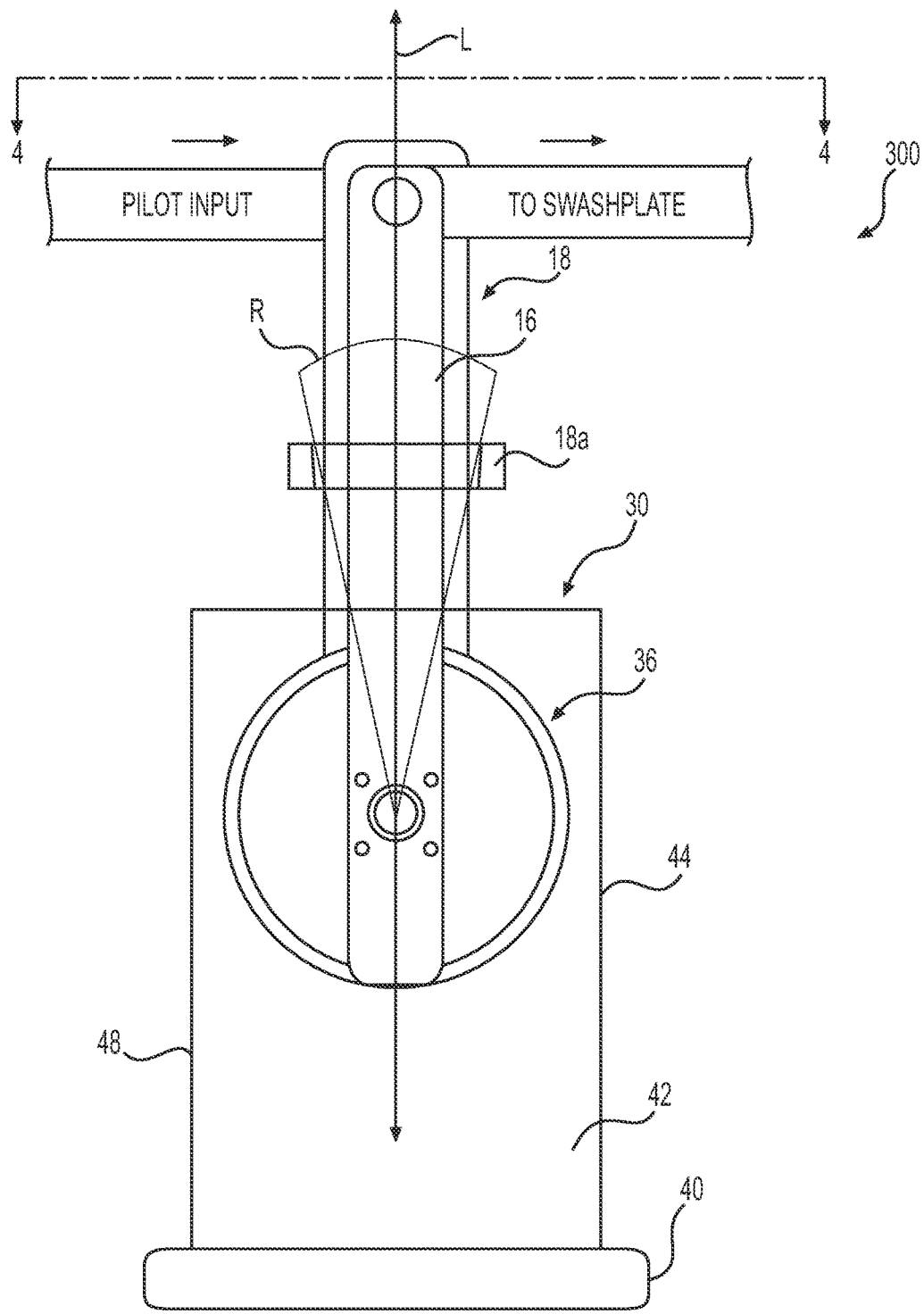
FIG. 5 is a schematic side view of the automatic flight actuator system of FIG. 4.

With reference now to FIGS. 4 and 5, a schematic illustration of an automatic flight control actuator system 300 is shown. As the automatic flight control actuator system 300 may be similar to the automatic flight control actuator system 10 discussed with regard to FIGS. 1-3, only the differences between the automatic flight control actuator system 10 and the automatic flight control actuator system 300 will be discussed in detail herein, with the same reference numerals used to denote the same or substantially similar components. Similar to the automatic flight control actuator system 10, the automatic flight control actuator system 300 may be employed with the aircraft 12 to provide output to the swashplate 14a for controlling the operation or movement of the rotor blade 14b (FIG. 1). The automatic flight control actuator system 300 includes the swashplate output linkage 16, the pilot input linkage 18, the housing 30, the trim input system 32, a stability augmentation system 302 and the strain wave gear 36.

The stability augmentation system 302 controls or adjusts the swashplate output linkage 16 independently of the input by the pilot to the pilot control stick 24 to ensure stable movement of the flight surfaces 14 (FIG. 1). In one example, the stability augmentation system 302 includes the first stability augmentation motor 100, a first brake 301, the second stability augmentation motor 104, a second brake 303, a first spur gear 304, a second spur gear 306, a differential gear assembly 308 and a sensor system 311.

The first brake 301 is coupled to the first stability augmentation motor 100 and the second brake 303 is coupled to the second stability augmentation motor 104. Each of the first brake 301 and the second brake 303 are responsive to one or more control signals from the control module to brake or prevent the further rotation of the respective one of the first stability augmentation motor 100 and the second stability augmentation motor 104. Thus, the first brake 301 and the second brake 303 prevent the rotation of the first spur gear 304 and second spur gear 306, respectively, in the case of an issue associated with the first stability augmentation motor 100 and the second stability augmentation motor 104. The first brake 301 and the second brake 303 may comprise any suitable brake coupled to the respective one of the first stability augmentation motor 100 and the second stability augmentation motor 104.

The first spur gear 304 is coupled to the output shaft 114 of the first stability augmentation motor 100. The first spur gear 304 is coupled to the output shaft 114 via any suitable technique, such as press-fit, welding, etc. The first spur gear 304 is generally composed of a metal or metal alloy, and may be formed or manufactured through any suitable technique, such as casting, machining, hot isostatic pressing, etc. The first spur gear 304 may have a diameter SD1, which is about equal to a diameter SD2 of the second spur gear 306. The first spur gear 304 includes a hub 310 and an engagement surface 312. The hub 310 defines a bore 310a, which couples the first spur gear 304 to the output shaft 114. The engagement surface 312 couples or engages the first spur gear 304 with the differential gear assembly 308. In one example, the engagement surface 312 comprises a plurality of teeth defined about a perimeter or circumference of the first spur gear 304 at a periphery of the first spur gear 304. The engagement surface 312 may define a ratio of first spur gear 304 motion to differential gear assembly 308 motion of approximately 5 to 1. In addition, the differential gear assembly 308 induces a ratio of about 2 to 1 from the differential gear assembly 308 to the wave generator input shaft 126, assuming a second driven gear 326 associated with the differential gear assembly 308 does not move. The ratio of the output of the first stability augmentation motor 100 to the wave generator input shaft 126 may be about 10 to 1. The ratio of the output of the first stability augmentation motor 100 to the swashplate output linkage 16 is about 2000 to 1.

The second spur gear 306 is coupled to the output shaft 120 of the second stability augmentation motor 104. The second spur gear 306 is coupled to the output shaft 120 via any suitable technique, such as press-fit, welding, etc. The second spur gear 306 is generally composed of a metal or metal alloy, and may be formed or manufactured through any suitable technique, such as casting, machining, hot isostatic pressing, etc. The second spur gear 306 includes a hub 314 and an engagement surface 316. The hub 314 defines a bore 314a, which couples the second spur gear 306 to the output shaft 120. The engagement surface 316 couples or engages the second spur gear 306 with the differential gear assembly 308. In one example, the engagement surface 316 comprises a plurality of teeth defined about a perimeter or circumference of the second spur gear 306 at a periphery of the second spur gear 306. The engagement surface 316 may define a ratio of second spur gear 306 motion to differential gear assembly 308 motion of approximately 5 to 1. In addition, the differential gear assembly 308 induces a ratio of about 2 to 1 from the differential gear assembly 308 to the wave generator input shaft 126, assuming a first driven gear 320 associated with the differential gear assembly 308 does not move. The ratio of the output of the second stability augmentation motor 104 to the wave generator input shaft 126 may be about 10 to 1. The ratio of the output of the second stability augmentation motor 104 to the swashplate output linkage 16 is about 2000 to 1.

Figure 4A:
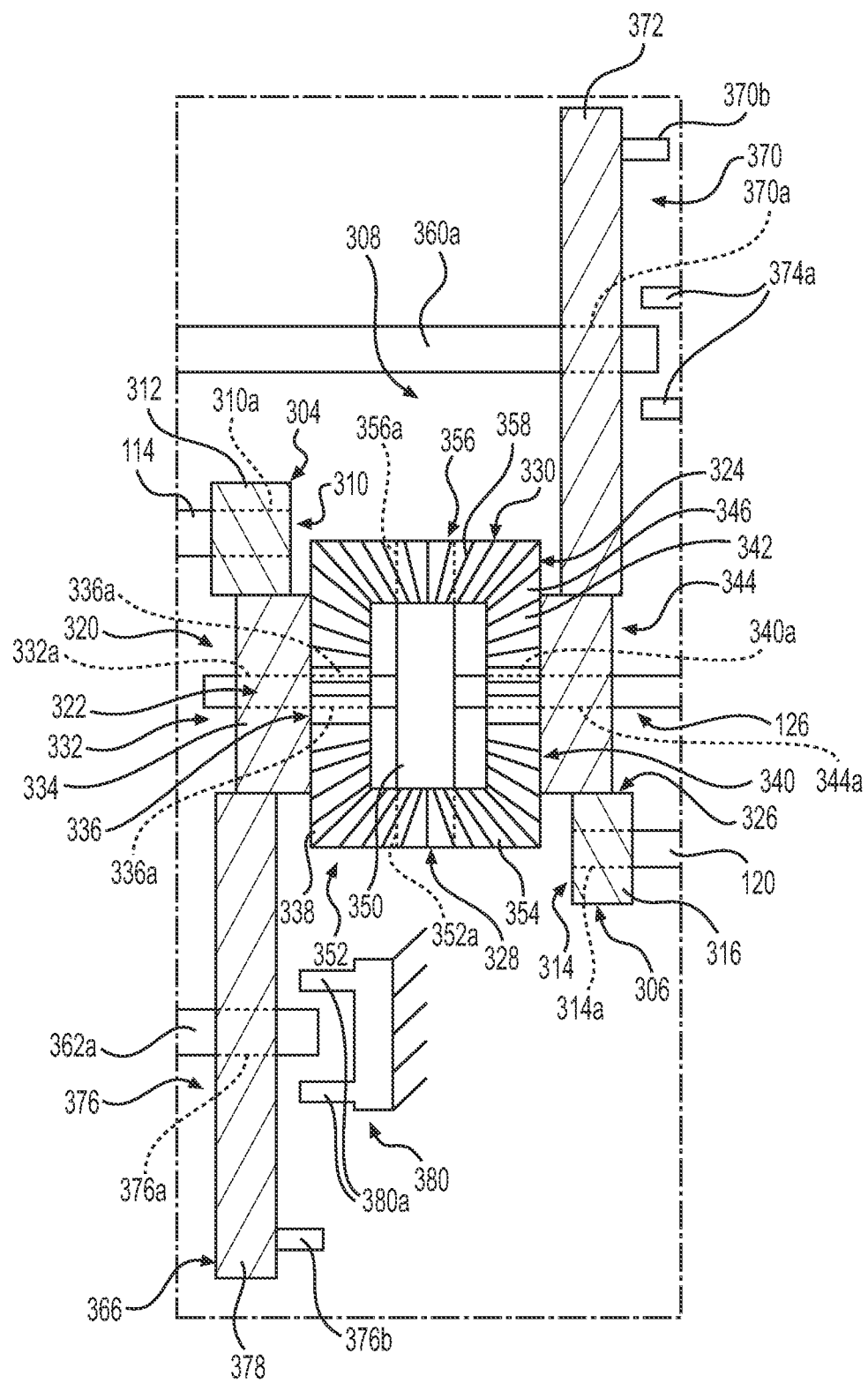
FIG. 4A is a detail view of a differential gear assembly of FIG. 4.

With reference to FIGS. 4 and 4A, the differential gear assembly 308 is coupled to the first spur gear 304, the second spur gear 306 and the wave generator input shaft 126. The differential gear assembly 308 is driven by either one of the first spur gear 304 and the second spur gear 306 to adjust the swashplate output linkage 16 independently of the input by the pilot. The differential gear assembly 308 includes a first driven gear 320, a first bevel gear 322, a second bevel gear 324, a second driven gear 326, a first pinion gear 328 and a second pinion gear 330.

The first driven gear 320 rotates freely about the wave generator input shaft 126. The first driven gear 320 is driven by the first stability augmentation motor 100. The first driven gear 320 is generally composed of a metal or metal alloy, and may be formed or manufactured through any suitable technique, such as casting, machining, hot isostatic pressing, etc. The first driven gear 320 includes a hub 332 and an engagement surface 334. The hub 332 defines a bore 332a, which allows the first driven gear 320 to rotate freely around the wave generator input shaft 126. The engagement surface 334 couples or engages the first driven gear 320 with the first spur gear 304. In one example, the engagement surface 334 comprises a plurality of teeth defined about a perimeter or circumference of the first driven gear 320 at a periphery of the first driven gear 320.

The first bevel gear 322 is fixedly coupled to the first driven gear 320. The first bevel gear 322 is generally composed of a metal or metal alloy, and may be formed or manufactured through any suitable technique, such as casting, machining, hot isostatic pressing, etc. The first bevel gear 322 includes a hub 336 and an engagement surface 338. The hub 336 defines a bore 336a, which allows the first bevel gear 322 to rotate freely around the wave generator input shaft 126. The engagement surface 338 couples or engages the first bevel gear 322 with the first pinion gear 328 and the second pinion gear 330. In one example, the engagement surface 338 comprises a plurality of beveled teeth defined about a perimeter or circumference of the first bevel gear 322 at a periphery of the first bevel gear 322.

The second bevel gear 324 is fixedly coupled to the second driven gear 326. The second bevel gear 324 is generally composed of a metal or metal alloy, and may be formed or manufactured through any suitable technique, such as casting, machining, hot isostatic pressing, etc. The second bevel gear 324 includes a hub 340 and an engagement surface 342. The hub 340 defines a bore 340a, which allows the second bevel gear 324 to rotate freely around the wave generator input shaft 126. The engagement surface 342 couples or engages the second bevel gear 324 with the first pinion gear 328 and the second pinion gear 330. In one example, the engagement surface 342 comprises a plurality of beveled teeth defined about a perimeter or circumference of the second bevel gear 324 at a periphery of the second bevel gear 324.

The second driven gear 326 rotates freely about the wave generator input shaft 126. The second driven gear 326 is driven by the second stability augmentation motor 104. The second driven gear 326 is generally composed of a metal or metal alloy, and may be formed or manufactured through any suitable technique, such as casting, machining, hot isostatic pressing, etc. The second driven gear 326 includes a hub 344 and an engagement surface 346. The engagement surface 346 couples or engages the second driven gear 326 with the second spur gear 306. In one example, the engagement surface 346 comprises a plurality of teeth defined about a perimeter or circumference of the second driven gear 326 at a periphery of the second driven gear 326.

The first pinion gear 328 is coupled to the first bevel gear 322 and the second bevel gear 324. The first pinion gear 328 is driven by the first bevel gear 322 and the second bevel gear 324 to rotate. The first pinion gear 328 is coupled to a shaft 350 with a bearing or bushing which allows it to rotate freely around shaft 350. The shaft 350 is fixedly coupled to the wave generator input shaft 126, such that movement or rotation of the shaft 350 causes a corresponding movement or rotation of the wave generator input shaft 126. The first pinion gear 328 is generally composed of a metal or metal alloy, and may be formed or manufactured through any suitable technique, such as casting, machining, hot isostatic pressing, etc. The first pinion gear 328 includes a hub 352 and an engagement surface 354. The hub 352 defines a bore 352a, which allows the first pinion gear 328 to rotate freely around shaft 350. The engagement surface 354 couples or engages the first pinion gear 328 with the first bevel gear 322 and the second bevel gear 324. In one example, the engagement surface 354 comprises a plurality of bevel teeth defined about a perimeter or circumference of the first pinion gear 328 at a periphery of the first pinion gear 328.

The second pinion gear 330 is coupled to the first bevel gear 322 and the second bevel gear 324. The second pinion gear 330 is driven by the first bevel gear 322 and the second bevel gear 324 to rotate. The second pinion gear 330 is coupled to the shaft 350 with a bearing or bushing which allows it to rotate freely around shaft 350. The second pinion gear 330 is generally composed of a metal or metal alloy, and may be formed or manufactured through any suitable technique, such as casting, machining, hot isostatic pressing, etc. The second pinion gear 330 includes a hub 356 and an engagement surface 358. The hub 356 defines a bore 356a, which allows the second pinion gear 330 to rotate freely around shaft 350. The engagement surface 358 couples or engages the second pinion gear 330 with the first bevel gear 322 and the second bevel gear 324. In one example, the engagement surface 358 comprises a plurality of bevel teeth defined about a perimeter or circumference of the second pinion gear 330 at a periphery of the second pinion gear 330.

The sensor system 311 observes conditions associated with the stability augmentation system 302 and generates sensor signals based thereon. In one example, the sensor system 311 comprises a first sensor 360, a second sensor 362, a first sensor gear 364 and a second sensor gear 366. It should be noted that while the sensor system 112 is described and illustrated herein as including both the first sensor 360 and the second sensor 362, the sensor system 311 may include a single sensor, if desired.

The first sensor 360 and the second sensor 362 may each comprise an angular sensor, such as a resistive angular sensor, that is capable of observing a position of the swashplate output linkage 16 relative to the pilot input linkage 18. It should be noted, however, that the first sensor 360 and the second sensor 362 may comprise any sensor that is capable of observing a position of the swashplate output linkage 16 relative to the pilot input linkage 18, including, but not limited to hall effect sensors, rotary variable differential transformer (RVDT) sensors, potentiometers, etc. In the example of the first sensor 360 and the second sensor 362 comprising angular sensors, the first sensor 360 and the second sensor 362 each include a driven shaft 360a, 362a, which are coupled to a respective one of the first sensor gear 364 and the second sensor gear 366. The first sensor 360 and the second sensor 362 generate sensor signals based on the movement of the driven shaft 360a, 362a. The first sensor 360 and the second sensor 362 may be in communication with the control module, which receives these sensor signals from the first sensor 360 and the second sensor 362 and determines a position of the swashplate output linkage 16 relative to the pilot input linkage 18 based on these sensor signals The first sensor gear 364 is coupled to the driven shaft 360a of the first sensor 360, and the second sensor gear 366 is coupled to the driven shaft 362a of the second sensor 362. The first sensor gear 364 is driven by the first driven gear 320, and the second sensor gear 366 is driven by the second driven gear 326. The first sensor gear 364 and the second sensor gear 366 each have a diameter, which is larger than a diameter of each of the first driven gear 320 and the second driven gear 326. Generally, the first sensor gear 364 and the second sensor gear 366 are each sized and configured such that the gear ratio between the first sensor gear 364 and the first driven gear 320 is about 6 to 1. The gear ratio between the second sensor gear 366 and the second driven gear 326 is also about 6 to 1. The first sensor gear 364 and the second sensor gear 366 are coupled to the respective one of the driven shaft 360a, 362a via any suitable technique, such as press-fit, welding, etc. The first sensor gear 364 and the second sensor gear 366 are generally composed of a metal or metal alloy, and may be formed or manufactured through any suitable technique, such as casting, machining, hot isostatic pressing, etc.

The first sensor gear 364 includes a hub 370 and an engagement surface 372. The hub 370 defines a bore 370a, which couples the first sensor gear 364 to the driven shaft 360a. The hub 370 also includes at least one limit stop 370b. The at least one limit stop 370b extends outwardly from the hub 370 to contact a stop 374. The contact between the at least one limit stop 370b and the stop 374 prevents further advancement of the first sensor gear 364. Generally, the stop 374 comprises two posts 374a, which are coupled to the cavity 52 of the housing 30. The engagement surface 372 couples or engages the first sensor gear 364 with the first driven gear 320. In one example, the engagement surface 372 comprises a plurality of teeth defined about a perimeter or circumference of the first sensor gear 364 at a periphery of the first sensor gear 364.

The second sensor gear 366 includes a hub 376 and an engagement surface 378. The hub 376 defines a bore 376a, which couples the second sensor gear 366 to the driven shaft 362a. The hub 376 also includes at least one limit stop 376b. The at least one limit stop 376b extends outwardly from the hub 376 to contact a stop 380. The contact between the at least one limit stop 376b and the stop 380 prevents further advancement of the second sensor gear 366. Generally, the stop 380 comprises two posts 380a, which are coupled to the cavity 52 of the housing 30. The engagement surface 378 couples or engages the second sensor gear 366 with the second driven gear 326. In one example, the engagement surface 378 comprises a plurality of teeth defined about a perimeter or circumference of the second sensor gear 366 at a periphery of the second sensor gear 366.

As the assembly and use of the automatic flight control actuator system 300 may be substantially similar to the assembly and use of the automatic flight control actuator system 10 discussed with regard to FIGS. 1-3, only the differences between the automatic flight control actuator system 300 and the automatic flight control actuator system 10 will be discussed in detail herein. Briefly, the stability augmentation system 302 is assembled within the housing 30 such that the first spur gear 304 meshingly engages with the first driven gear 320 of the differential gear assembly 308, and the second spur gear 306 meshingly engages with the second driven gear 326. The differential gear assembly 308 is arranged in the housing 30 such that the first bevel gear 322 and the second bevel gear 324 each meshingly engage with each of the first pinion gear 328 and the second pinion gear 330.

In use, the first stability augmentation motor 100 is capable of rotating or driving the wave generator input shaft 126 independent of the second stability augmentation motor 104 via the differential gear assembly 308 based on the receipt of one or more control signals from the control module. Similarly, the second stability augmentation motor 104 is capable of rotating or driving the wave generator input shaft 126 independent of the first stability augmentation motor 100 via the engagement of the second spur gear 306 with the second driven gear 326 based on receipt of one or more control signals from the control module.

Figure 6:
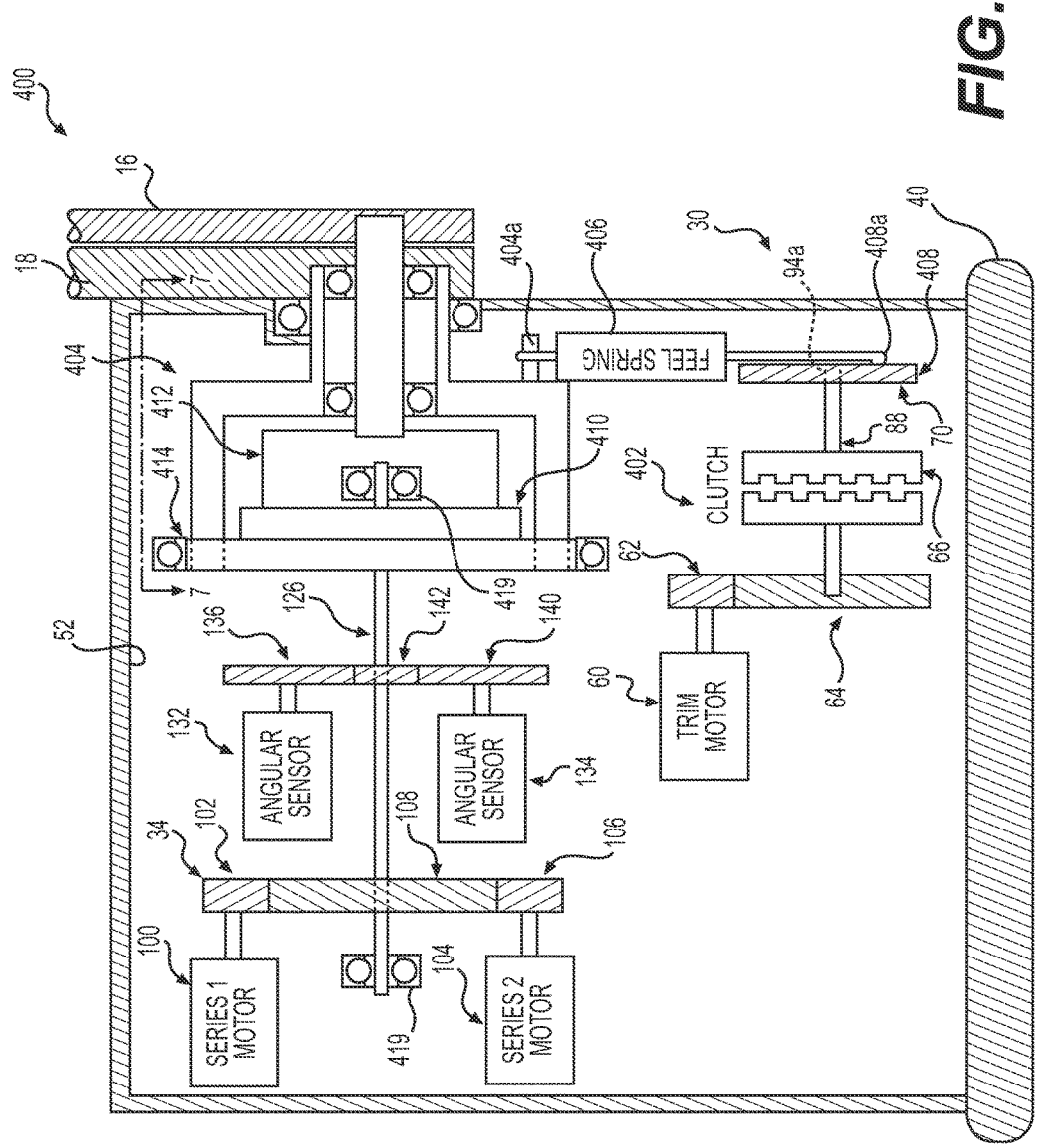
FIG. 6 is a schematic cross-sectional illustration of an automatic flight actuator system for use with the mobile platform of FIG. 1 in accordance with various embodiments.

With reference now to FIG. 6, a schematic illustration of an automatic flight actuator system 400 is shown. As the automatic flight actuator system 400 may be similar to the automatic flight control actuator system 10 discussed with regard to FIGS. 1-3, only the differences between the automatic flight control actuator system 10 and the automatic flight actuator system 400 will be discussed in detail herein, with the same reference numerals used to denote the same or substantially similar components. Similar to the automatic flight control actuator system 10, the automatic flight actuator system 400 may be employed with the aircraft 12 to provide output to the swashplate 14a for controlling the operation or movement of the rotor blade 14b (FIG. 1). The automatic flight actuator system 400 includes the swashplate output linkage 16, the pilot input linkage 18, the housing 30, a trim input system 402, the stability augmentation system 34 and a strain wave gear 404.

The trim input system 402 is received within the cavity 52 of the housing 30, and is generally contained wholly within the housing 30. The trim input system 402 maintains the position of the pilot control stick 24, and also adjusts or re-centers the stability augmentation system 34. In one example, the trim input system 402 includes the trim motor 60, the first gear 62, the second gear 64, the clutch 66, a feel biasing member or spring 406 and a third gear 408.

The spring 406 is coupled to the third gear 70 and to a portion of the strain wave gear 404. The spring 406 comprises any suitable biasing member, such as a coil spring, etc. In one example, the spring 406 is coupled to a notch 408a defined in the third gear 70 and to a post 404a of the strain wave gear 404. The spring 406 is generally coupled to the third gear 408 and the strain wave gear 404 such that the spring 406 is able to provide resistance against the movement of the driven shaft 88 so that as the pilot applies input to the pilot control stick 24 (FIG. 1), the spring 406 resists the pilot input to provide the pilot with the feel of a resistance during manual flight. Thus, one end of the spring 406 is fixedly coupled to the third gear 408, while another end of the spring 406 is coupled to the strain wave gear 404 such that the spring 406 resists input to the driven shaft 88.

The third gear 408 is coupled to the second end 88b of the driven shaft 88, and is coupled to the spring 406. As the third gear 408 is substantially similar to the third gear 70 discussed with regard to FIGS. 1-3, only the differences between the third gear 408 and the third gear 70 will be discussed in detail herein and the same reference numerals will be used to denote the same or similar components. The third gear 408 includes the notch 408a, which is defined in the hub 94. Generally, the notch 408a comprises a recess that is sized to receive an end of the spring 406 to fixedly couple the spring 406 to the third gear 408. The notch 408a is defined in the hub 94 so as to be offset from the bore 94a.

The strain wave gear 404 is coupled to the trim input system 402, the stability augmentation system 34, the swashplate output linkage 16 and the pilot input linkage 18. The strain wave gear 404 comprises a wave generator 410, a flex spline 412 and a circular spline 414. The wave generator 410 is coupled to and rotatable within the flex spline 412. The wave generator 410 includes a wave generator cam 416, a bearing 418, and the wave generator input shaft 126. The wave generator cam 416 is generally elliptical, and is received within the bearing 418. The wave generator cam 416 is composed of a suitable material, such as a metal or metal alloy. The bearing 418 is a thin-raced ball bearing, having an inner ring 418a and an outer ring 418b. In one example, the races and the balls of the bearing 418 are generally composed of a metal or metal alloy. The wave generator cam 416 is coupled to the bearing 418 such that the inner ring 418a of the bearing 418, and thus, the outer ring 418b, conforms to the elliptical shape of the wave generator cam 416. The wave generator input shaft 126 is coupled to the wave generator cam 416. The wave generator input shaft 126 may be supported for rotation via one or more bearings 419, including, but not limited to, ball bearings. The wave generator input shaft 126 moves or rotates based on input from the first stability augmentation motor 100 and the second stability augmentation motor 104 (FIG. 6). The rotation of the wave generator input shaft 126 drives the wave generator cam 416, which in turn drives the bearing 418 within the flex spline 412.

The flex spline 412 is coupled to the swashplate output linkage 16 and to the wave generator 410. In one example, the flex spline 412 comprises a cylindrical thin-walled housing 420, which includes an inner surface 420a and an outer surface 420b. The housing 420 is coupled to a drive shaft 422, which in turn, is coupled to the swashplate output linkage 16. The flex spline 162 also defines a substantially circular cavity 424, which is bounded by the inner surface 420a. The inner surface 420a receives the wave generator 410. The outer surface 420b defines an engagement surface 426, which is coupled to or engages the circular spline 414. In one example, the engagement surface 426 comprises a plurality of teeth defined about a portion of the outer surface 420b. The engagement surface 426 may define about 200 teeth. As the flex spline 412 is composed of a metal or metal alloy, such as steel, with a thin-wall thickness, the flex spline 412 moves or deflects upon the rotation of the elliptical wave generator 410 within the cavity 424. The deflection of the flex spline 412 with the movement of the wave generator 410 causes the engagement surface 426 of the flex spline 412 to move relative to the circular spline 414. Generally, the movement of the flex spline 412 is in an opposite direction (e.g. clockwise or counterclockwise) than the movement of the wave generator 410.

The drive shaft 422 of the flex spline 412 transmits the rotation of the flex spline 412 to the swashplate output linkage 16. The drive shaft 422 may be fixedly coupled to the housing 420 of the flex spline 412, and may be supported for rotation therewith via one or more bearings 428. The drive shaft 422 defines a bore 422a, which is sized to receive a portion of the wave generator input shaft 126 and one of the bearings 419 such that the wave generator input shaft 126 may rotate relative to the drive shaft 422.

Figure 7:
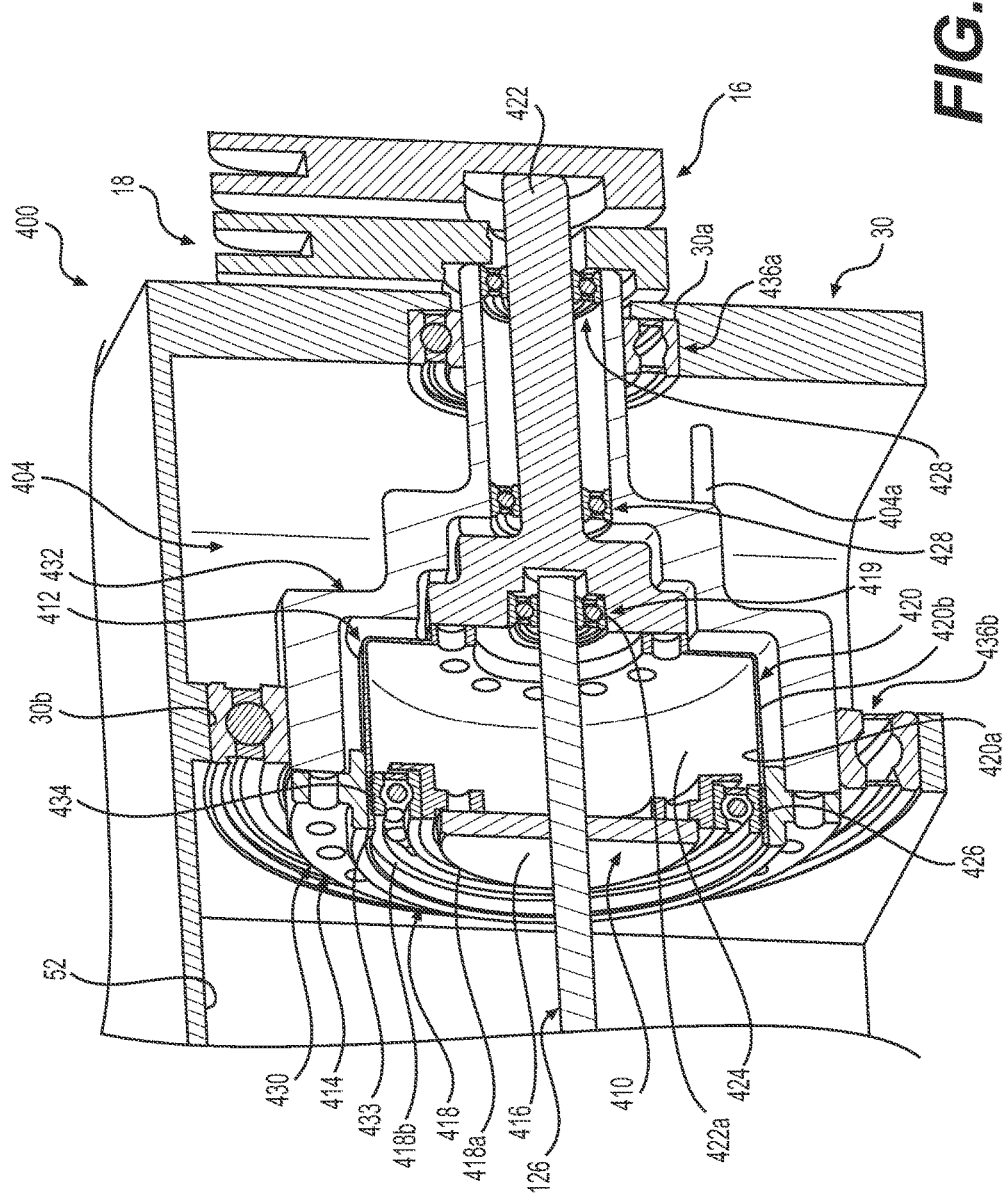
FIG. 7 is a schematic cross-sectional detail view of a portion of the automatic flight actuator system of FIG. 6.

With reference to FIGS. 6 and 7, the circular spline 414 is coupled to the pilot input linkage 18, the trim input system 32 (FIG. 6) and the flex spline 412. The circular spline 414 is generally composed of a metal or metal alloy, and includes a base 430 and a hub 432. The base 430 defines an annular or ring-shaped opening 433 and an engagement surface 434. The ring-shaped opening 433 receives the flex spline 412 such that the engagement surface 434 engages with the engagement surface 426 of the flex spline 412. The engagement surface 434 is defined about an inner circumference of the ring-shaped opening 433, and in one example, comprises a plurality of teeth. The engagement surface 434 may define about 202 teeth.

The hub 432 is supported on the housing 30 for rotation via one or more bearings 436. The bearings 436 comprise a ball bearing; however, any suitable bearing or bushing may be employed to assist in the rotation of the circular spline 414. In one example, the hub 432 comprises two bearings 436a, 436b. The bearing 436a is received in the opening 30a defined in the first side 42 of the housing 30, and the bearing 436b is received within a support 30b defined in the cavity 52 of the housing 30. An end of the hub 432 is coupled to the pilot input linkage 18. Thus, the rotation or movement of the base 430 via the motion of the flex spline 412 and/or wave generator 410 is transferred from the base 430 to the hub 432 and to the pilot input linkage 18. The hub 432 also includes the post 404a, which couples the spring 406 (FIG. 6) to the hub 432. The movement of the third gear 408 causes the movement of the spring 406, which in turn causes a movement or rotation of the hub 432. This rotation of the hub 432 rotates the base 430, resulting in a corresponding rotation of the pilot input linkage 18.

As the assembly and use of the automatic flight actuator system 400 may be substantially similar to the assembly and use of the automatic flight control actuator system 10 discussed with regard to FIGS. 1-3, the assembly and use of the automatic flight actuator system 400 will not be discussed in great detail herein. Briefly, however, with the strain wave gear 404 assembled within the housing 30, and the spring 406 coupled to the third gear 408, upon receipt of input from the pilot input linkage 18, the circular spline 414 rotates. The rotation of the circular spline 414 causes a rotation of the flex spline 412, which thereby causes a rotation of the swashplate output linkage 16. The motion of the swashplate output linkage 16 based on the pilot input linkage 18 and the strain wave gear 404 may be calculated using Equation (1) above.

With reference to FIGS. 6 and 7, the rotation of the wave generator input shaft 126 by the first stability augmentation motor 100 and/or the second stability augmentation motor 104 (FIG. 6) causes the rotation of the wave generator cam 416 and bearing 418 within the flex spline 412 (FIG. 7). This rotation of the wave generator cam 416 and the bearing 418 within the flex spline 412 results in a deflection and movement of the flex spline 412, thereby resulting in a movement of the swashplate output linkage 16, and thus, the swashplate 14*a* (FIG. 1).

The trim motor 60 may adjust a position of the pilot control stick 24 (FIG. 1) based on the receipt of one or more control signals from the control module to rotate the output shaft 72. The rotation of the output shaft 72 causes the first gear 62 to drive the second gear 64. With the clutch 66 engaged, the driving of the second gear 64 results in the rotation of the driven shaft 88, and thus, the third gear 70. The driving of the third gear 70 via the driven shaft 88 drives or rotates the spring 406, which in turn, rotates the hub 432 and the circular spline 414. The rotation of the circular spline 414 moves the pilot input linkage 18, and thus, the pilot control stick 24 (FIG. 1).

Figure 8:
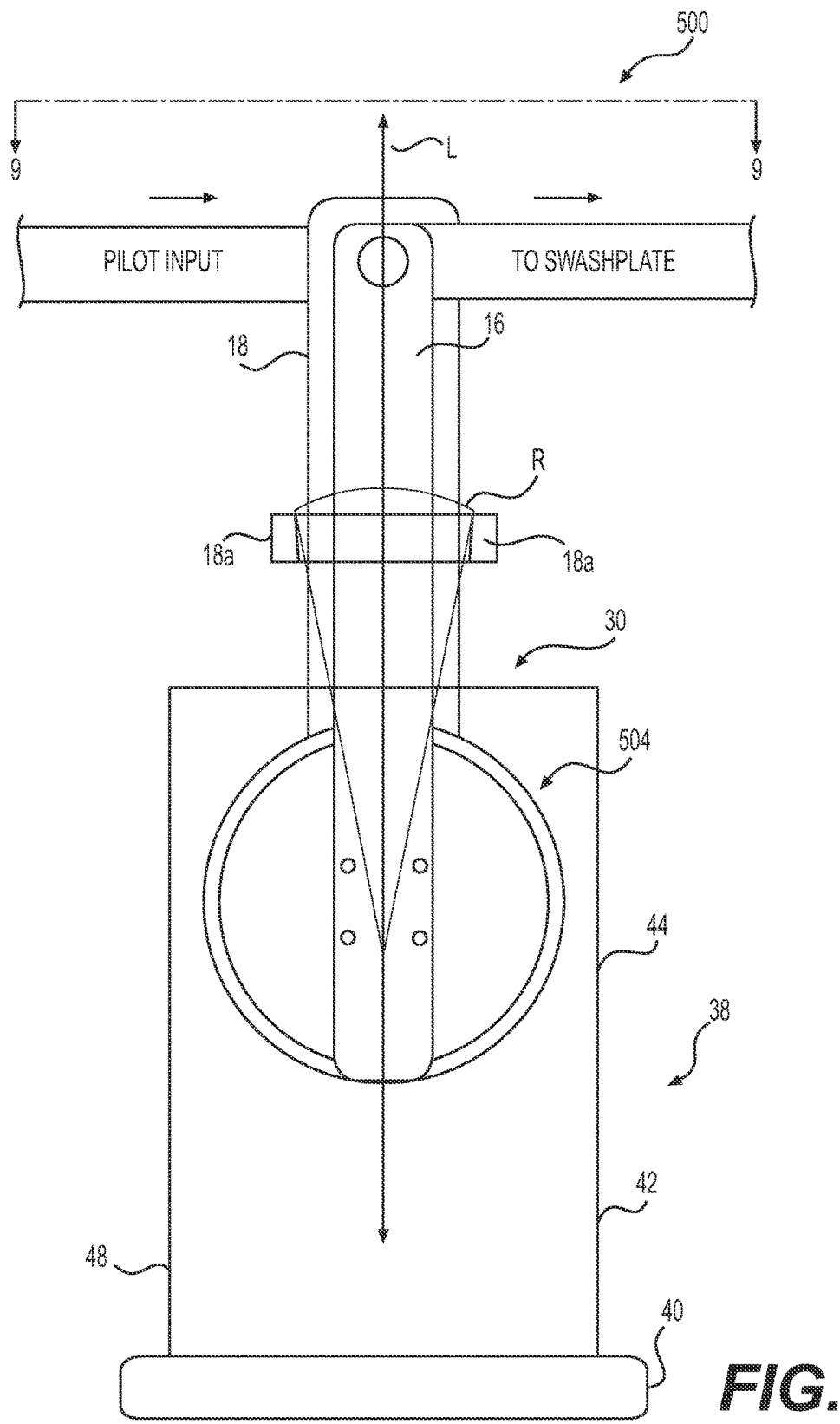
FIG. 8 is a schematic side view of an automatic flight actuator system for use with the mobile platform of FIG. 1 in accordance with various embodiments.
Figure 9:
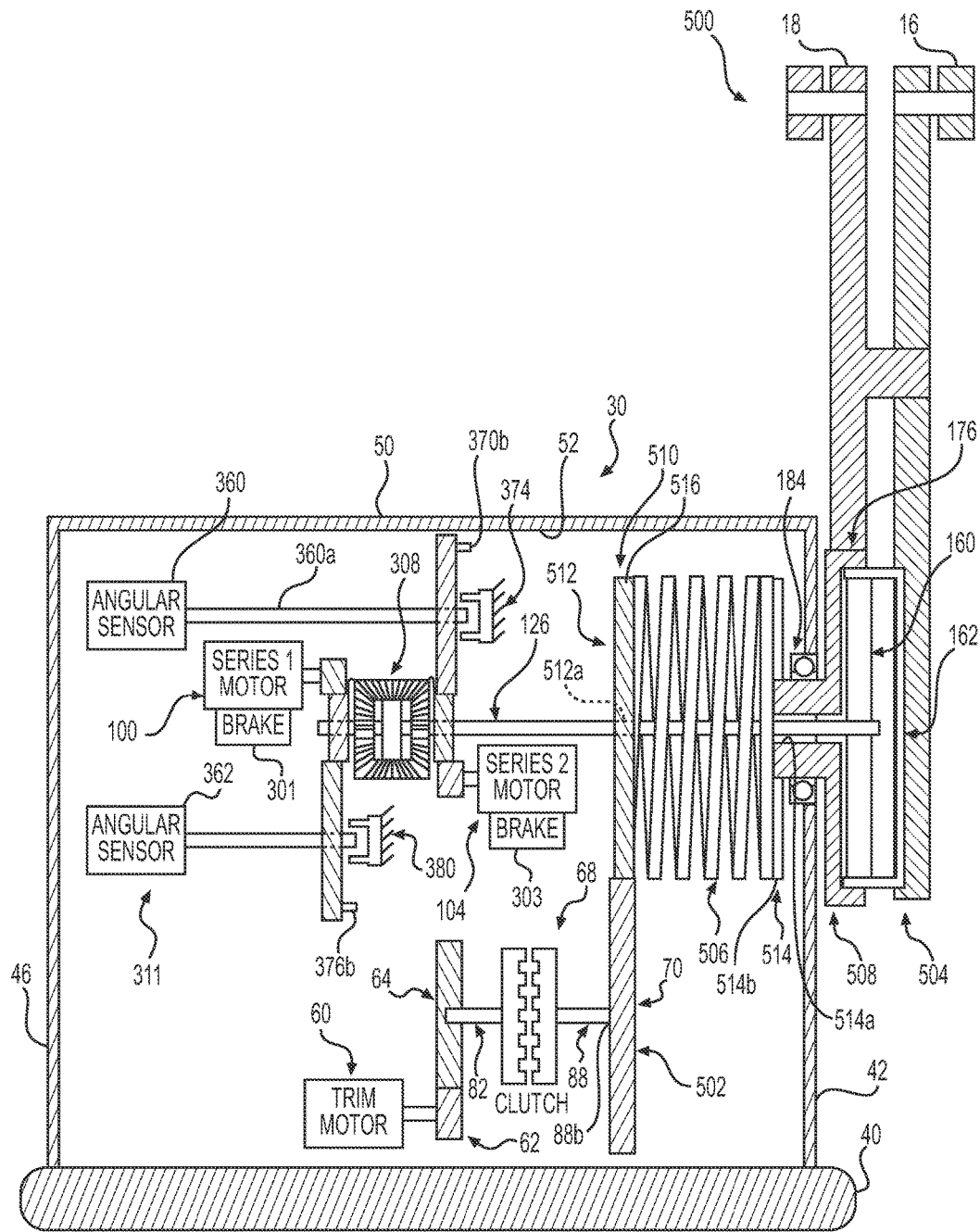
FIG. 9 is a schematic cross-sectional illustration of the automatic flight actuator system of FIG. 8, taken along line 9-9 of FIG. 8.

With reference now to FIGS. 8 and 9, a schematic illustration of an automatic flight actuator system 500 is shown. As the automatic flight actuator system 500 may be similar to the automatic flight control actuator system 10 discussed with regard to FIGS. 1-3 and the automatic flight control actuator system 300 discussed with regard to FIGS. 4 and 5, only the differences between the automatic flight control actuator systems 10, 300 and the automatic flight actuator system 500 will be discussed in detail herein, with the same reference numerals used to denote the same or substantially similar components. Similar to the automatic flight control actuator systems 10, 300, the automatic flight actuator system 500 may be employed with the aircraft 12 to provide output to the swashplate 14*a* for controlling the operation or movement of the rotor blade 14*b* (FIG. 1). The automatic flight actuator system 500 includes the swashplate output linkage 16, the pilot input linkage 18, the housing 30, a trim input system 502, the stability augmentation system 302 and a strain wave gear 504.

With reference to FIG. 9, the trim input system 502 maintains the position of the pilot control stick 24. In one example, the trim input system 502 includes the trim motor 60, the first gear 62, the second gear 64, the clutch 66, a feel biasing member or spring 506 and the third gear 70. As the trim input system 502 may be substantially similar to the trim input system 32, the trim input system 502 will not be discussed in great detail herein. Briefly, the trim motor 60 through the clutch 66 acts as a ground for the spring 506 so it exerts a force against pilot control motion. The pilot has the option of controlling the clutch 66 and the trim motor 60 in manual flight to allow adjustment of the neutral location of the spring 506. Pushing the "Force Trim Release" button on the control disengages the clutch 66 and allows the pilot to reposition the pilot control, such as the pilot control stick 24, with no force or compression of the spring 506. Releasing the button reengages the clutch 66 and once again the spring 506 exerts force against pilot motion but from a new neutral position where the button was released. In addition, the pilot can push "trim beep" switches which will drive the trim motor 60 and reposition the spring 506 while the clutch 66 remains engaged to allow the pilot to incrementally adjust the spring 506 neutral position. If the pilot engages the automatic flight control actuator system 10, the pilot is normally not exerting force on the pilot control, such as the pilot control stick 24, and the spring 506 will hold the pilot control stick 24 in a fixed position.

The spring 506 is disposed about the wave generator input shaft 126 of the strain wave gear 504. In one example, the spring 506 is coupled about the wave generator input shaft 126 between a circular spline 508 and a gear 510 associated with the strain wave gear 504. The spring 506 comprises any suitable biasing member, such as a coil spring, etc. The spring 506 is generally coupled about a portion of the wave generator input shaft 126 such that the spring 506 is able to provide resistance via the gear 510 and the third gear 70 against the movement of the driven shaft 88. Thus, as the pilot applies input to the pilot control stick 24, the spring 506 resists the pilot input to provide the pilot with the feel of a resistance during manual flight. Thus, one end of the spring 506 may be fixedly coupled to a portion of the circular spline 508, while another end of the spring 506 is coupled to a hub 512 of the gear 510.

In this example, the third gear 70 is coupled to the second end 88*b* of the driven shaft 88, and is coupled to the gear 510 of the strain wave gear 36. The third engagement surface 96 couples or engages the third gear 70 with the gear 510.

The strain wave gear 504 is coupled to the trim input system 502, the stability augmentation system 34, the swashplate output linkage 16 and the pilot input linkage 18. The strain wave gear 504 comprises the wave generator 160, the flex spline 162 and the circular spline 508. The circular spline 508 is coupled to the pilot input linkage 18, the trim input system 32 and the flex spline 162. The circular spline 508 is generally composed of a metal or metal alloy, and includes the base 176 and a hub 514. The hub 514 is supported on the housing 30 for rotation via the bearing 184. The hub 514 defines a bore 514*a*, which is sized to receive a portion of the wave generator input shaft 126 such that the wave generator input shaft 126 may rotate freely relative to the hub 514. The hub 514 includes a flange 514*b*. The flange 514*b* couples the hub 514 to the spring 506. The spring 506 is received between the flange 514*b* of the hub 514 and the gear 510. In this embodiment, the spring 506 couples the circular spline 508 to the gear 510.

The gear 510 is coupled to the hub 514 to drive the circular spline 508, based on input from the trim motor 60 of the trim input system 32. The gear 510 is generally composed of a metal or metal alloy, and may be formed or manufactured through any suitable technique, such as casting, machining, hot isostatic pressing, etc. The gear 510 defines the hub 512 and an engagement surface 516. The hub 512 defines a bore 512*a*, which enables the wave generator input shaft 126 to pass through the gear 510. The engagement surface 516 couples or engages the gear 510 with the third gear 70. In one example, the engagement surface 516 comprises a plurality of teeth defined about a perimeter or circumference of the gear 510 at a periphery of the gear 510.

As the assembly and use of the automatic flight actuator system 500 may be substantially similar to the assembly and use of the automatic flight control actuator system 10 discussed with regard to FIGS. 1-3, the assembly and use of the automatic flight actuator system 500 will not be discussed in detail herein.

Figure 10:
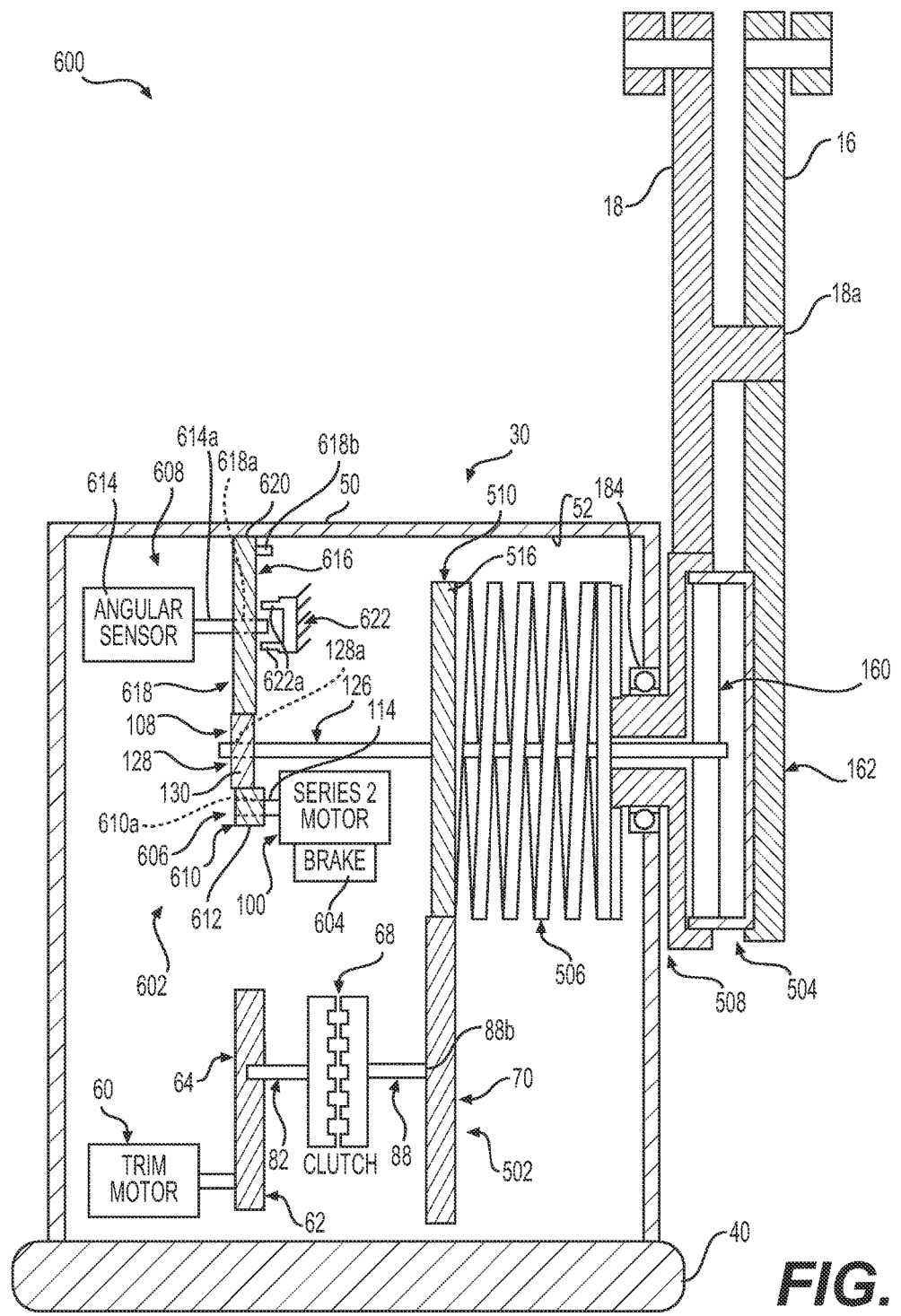
FIG. 10 is a schematic cross-sectional illustration of another exemplary automatic flight actuator system, taken along line 9-9 of FIG. 8.

With reference now to FIG. 10, a schematic illustration of an automatic flight actuator system 600 is shown. As the automatic flight actuator system 600 may be similar to the automatic flight control actuator system 10 discussed with regard to FIGS. 1-5 and the automatic flight control actuator system 500 discussed with regard to FIGS. 8 and 9, only the differences between the automatic flight control actuator systems 10, 500 and the automatic flight actuator system 600 will be discussed in detail herein, with the same reference numerals used to denote the same or substantially similar components. Similar to the automatic flight control actuator systems 10, 500, the automatic flight actuator system 600 may be employed with the aircraft 12 to provide output to the swashplate 14a for controlling the operation or movement of the rotor blade 14b (FIG. 1). The automatic flight actuator system 600 includes the swashplate output linkage 16, the pilot input linkage 18, the housing 30, the trim input system 502, a stability augmentation system 602 and the strain wave gear 504.

With reference to FIG. 10, the stability augmentation system 602 controls or adjusts the swashplate output linkage 16 independently of the input by the pilot to the pilot control stick 24 to ensure stable movement of the flight surfaces 14, such as the swashplate 14a (FIG. 1). In one example, the stability augmentation system 602 includes the first stability augmentation motor 100, a brake 604, a gear 604, the sixth gear 108 and a sensor system 608. The first stability augmentation motor 100 is used during manual flight to augment the flying qualities of the aircraft 12 by providing control outputs which are mechanically summed with the pilot manual inputs to improve aircraft handling qualities and help stabilize the aircraft 12. The first stability augmentation motor 100 is also used when the automatic flight control actuator system 10 is engaged and becomes the primary autopilot actuation motor. In this role the first stability augmentation motor 100 provides rate and attitude control inputs along with outer loop control commands such as altitude hold, heading select, localizer and glide slope modes. Since the control range may be limited the trim motor 60 assists the first stability augmentation motor 100 with large authority low frequency motion inputs.

The first stability augmentation motor 100 comprises a brushless motor, which has an output shaft 114. The first stability augmentation motor 100 is responsive to one or more control signals from the control module to rotate the output shaft 114. The rotation of the output shaft 114 drives the gear 606. The brake 604 is coupled to the first stability augmentation motor 100. The brake 604 is responsive to one or more control signals from the control module to brake or prevent the further rotation of the first stability augmentation motor 100. Thus, the brake 604 prevents the rotation of the gear 606, in the case of an issue associated with the first stability augmentation motor 100. The brake 604 may comprise any suitable brake coupled to the first stability augmentation motor 100.

The gear 606 is coupled to the output shaft 114 of the first stability augmentation motor 100. The gear 606 is coupled to the output shaft 114 via any suitable technique, such as press-fit, welding, etc. The gear 606 is generally composed of a metal or metal alloy, and may be formed or manufactured through any suitable technique, such as casting, machining, hot isostatic pressing, etc. The gear 606 may have a diameter, which is smaller than a diameter of the sixth gear 108. The gear 606 includes a hub 610 and an engagement surface 612. The hub 610 defines a bore 610a, which couples the gear 606 to the output shaft 114. The engagement surface 612 couples or engages the gear 606 with the sixth gear 108. In one example, the engagement surface 118 comprises a plurality of teeth defined about a perimeter or circumference of the gear 606 at a periphery of the gear 606. The ratio of the output of the first stability augmentation motor 100 to the gear 108 may be about 6 to 1.

The sixth gear 108 is coupled to both the gear 606 and the sensor system 608. The sixth gear 108 is coupled to the wave generator input shaft 126 of the strain wave gear 36 and is driven by the gear 606 to adjust the swashplate output linkage 16 independently of the input by the pilot.

The sensor system 608 observes conditions associated with the stability augmentation system 602 and generates sensor signals based thereon. In one example, the sensor system 608 comprises a first sensor 614 and a gear 616. The first sensor 614 may comprise an angular sensor, such as a resistive angular sensor, that is capable of observing a position of the swashplate output linkage 16 relative to the pilot input linkage 18. It should be noted, however, that the first sensor 614 may comprise any sensor that is capable of observing a position of the swashplate output linkage 16 relative to the pilot input linkage 18, including, but not limited to hall effect sensors, rotary variable differential transformer (RVDT) sensors, potentiometers, etc. In the example of the first sensor 614 comprising an angular sensor, the first sensor 614 includes a driven shaft 614a, which is coupled to the gear 616. The first sensor 614 generates sensor signals based on the movement of the driven shaft 614a. The first sensor 614 may be in communication with the control module, which receives these sensor signals from the first sensor 614 and determines a position of the swashplate output linkage 16 relative to the pilot input linkage 18 based on these sensor signals.

The gear 616 is coupled to the driven shaft 614a of the first sensor, and is driven by the sixth gear 108. The gear 616 has a diameter, which is larger than a diameter of the sixth gear 108. Generally, the gear 616 and is sized and configured such that the gear ratio between the sixth gear 108 and the gear 616 is about 5 to 1. The gear 616 is coupled to the driven shaft 614a, via any suitable technique, such as press-fit, welding, etc. The gear 616 is generally composed of a metal or metal alloy, and may be formed or manufactured through any suitable technique, such as casting, machining, hot isostatic pressing, etc.

The gear 616 includes a hub 618 and an engagement surface 620. The hub 618 defines a bore 618a, which couples the gear 616 to the driven shaft 614a. The hub 618 also includes at least one limit stop 618b. The at least one limit stop 618b extends outwardly from the hub 618 to contact a stop 622. The contact between the at least one limit stop 618b and the stop 622 prevents further advancement of the gear 616. Generally, the stop 622 comprises two posts 622a, which are coupled to the cavity 52 of the housing 30. The engagement surface 620 couples or engages the gear 616 with the sixth gear 108. In one example, the engagement surface 620 comprises a plurality of teeth defined about a perimeter or circumference of the gear 616 at a periphery of the gear 616.

As the assembly and use of the automatic flight actuator system 600 may be substantially similar to the assembly and use of the automatic flight control actuator system 10 discussed with regard to FIGS. 1-3, the assembly and use of the automatic flight actuator system 600 will not be discussed in detail herein.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An automatic flight control actuator system, comprising:
    a pilot input linkage that receives an input;
    a flight surface output linkage adapted to control a flight surface;
    a strain wave gear including a flex spline coupled to the flight surface output linkage, and a circular spline coupled to the pilot input linkage and coupled to the flex spline such that the input from the pilot input linkage is transferred to the flight surface output linkage via the strain wave gear, the strain wave gear comprising a wave generator including a wave generator input shaft coupled to a wave generator cam, the wave generator cam received within a bearing, the bearing coupled to the flex spline such that movement of the wave generator input shaft moves the flight surface output linkage relative to the pilot input linkage; and
    a stability augmentation system including a first motor, the first motor coupled to the wave generator input shaft to drive the wave generator input shaft to move the flight surface output linkage independent of the pilot input linkage.

2. The automatic flight control actuator system of claim 1, wherein the stability augmentation system includes a second motor, the second motor coupled to the wave generator input shaft to drive the wave generator input shaft to move the flight surface output linkage independent of the pilot input linkage.

3. The automatic flight control actuator system of claim 1, wherein the circular spline further comprises a hub and a trim input system is coupled to the hub to move the hub to adjust the pilot input linkage.

4. The automatic flight control actuator system of claim 3, wherein the hub includes a first gear, and the trim input system includes a gear meshingly engaged with the first gear of the hub to move the hub.

5. The automatic flight control actuator system of claim 3, wherein the trim input system includes a feel spring coupled to the hub and a portion of the trim input system, the feel spring movable by the trim input system such that the movement of the feel spring by the trim input system moves the hub.

6. The automatic flight control actuator system of claim 5, wherein the trim input system comprises a trim motor coupled to a clutch, the clutch including a driving shaft driven by the trim motor and a driven shaft, the driven shaft coupled to a gear and the feel spring is coupled to the gear to be movable by the trim motor.

7. The automatic flight control actuator system of claim 3, wherein the trim input system comprises a trim motor, which is coupled to a feel spring via a clutch, and the feel spring is coupled about a driven shaft of the clutch.

8. The automatic flight control actuator system of claim 1, wherein the first motor of the stability augmentation system is coupled to the wave generator input shaft via a differential gear.

9. The automatic flight control actuator system of claim 1, wherein the flex spline includes a housing coupled to a drive shaft, with the housing coupled to the circular spline and the drive shaft coupled to the flight surface output linkage.

10. The automatic flight control actuator system of claim 1, wherein the flight surface output linkage is coupled to a swashplate.

11. An automatic flight control actuator system, comprising:
    a pilot input linkage that receives an input;
    a flight surface output linkage adapted to control a flight surface;
    a stability augmentation system for moving the flight surface output linkage; and
    a strain wave gear including a flex spline coupled to the flight surface output linkage, a circular spline coupled to the pilot input linkage and a wave generator coupled to the stability augmentation system, with the circular spline coupled to the flex spline such that the input from the pilot input linkage is transferred to the flight surface output linkage and the stability augmentation system drives the wave generator to move the flight surface output linkage independent of the input from the pilot input linkage.

12. The automatic flight control actuator system of claim 11, wherein the wave generator further comprises a wave generator input shaft driven by the stability augmentation system, the wave generator input shaft coupled to a wave generator cam received within a bearing, the bearing coupled to the flex spline such that movement of the wave generator input shaft by the stability augmentation system moves the flight surface output linkage.

13. The automatic flight control actuator system of claim 12, wherein the stability augmentation system includes a first motor and a second motor, and each of the first motor and the second motor are coupled to the wave generator input shaft to drive the wave generator input shaft to move the flight surface output linkage independent of the pilot input linkage.

14. The automatic flight control actuator system of claim 11, wherein the circular spline further comprises a hub and a trim input system is coupled to the hub to move the hub to adjust the pilot input linkage.

15. The automatic flight control actuator system of claim 14, wherein the hub includes a first gear, and the trim input system includes a gear meshingly engaged with the hub to move the hub.

16. The automatic flight control actuator system of claim 14, wherein the trim input system includes a trim motor and a feel spring coupled to the hub and a portion of the trim input system, the trim motor coupled to the feel spring via a clutch, and the feel spring is coupled about a driven shaft of the clutch, the feel spring movable by the trim input system such that the movement of the feel spring by the trim input system moves the hub.

17. The automatic flight control actuator system of claim 13, wherein the first motor of the stability augmentation system is coupled to the wave generator input shaft via a differential gear.

\* \* \* \* \*